United States Patent
Manjrekar

(10) Patent No.: US 9,887,550 B2
(45) Date of Patent: Feb. 6, 2018

(54) CONTROL SYSTEM FOR ELECTRICAL ENERGY OUTPUTTING DEVICE

(71) Applicant: THE UNIVERSITY OF NORTH CAROLINA AT CHARLOTTE, Charlotte, NC (US)

(72) Inventor: Madhav Manjrekar, Cary, NC (US)

(73) Assignee: THE UNIVERSITY OF NORTH CAROLINA AT CHARLOTTE, Charlotte, NC (US)

(*) Notice: Subject to any disclaimer, the term of this patent is extended or adjusted under 35 U.S.C. 154(b) by 93 days.

(21) Appl. No.: 15/034,575

(22) PCT Filed: Nov. 7, 2014

(86) PCT No.: PCT/US2014/064617
§ 371 (c)(1),
(2) Date: May 5, 2016

(87) PCT Pub. No.: WO2015/070058
PCT Pub. Date: May 14, 2015

(65) Prior Publication Data
US 2016/0276837 A1 Sep. 22, 2016

Related U.S. Application Data

(60) Provisional application No. 61/901,084, filed on Nov. 7, 2013.

(51) Int. Cl.
H02J 3/38 (2006.01)
H02M 7/49 (2007.01)
(Continued)

(52) U.S. Cl.
CPC ............ *H02J 3/383* (2013.01); *H02J 3/386* (2013.01); *H02M 7/44* (2013.01); *H02M 7/49* (2013.01);
(Continued)

(58) Field of Classification Search
CPC ...................................................... H02J 3/385
See application file for complete search history.

(56) References Cited

U.S. PATENT DOCUMENTS 6,556,461 B1 4/2003 Khersonsky et al.
8,031,495 B2* 10/2011 Sachdeva ............... H02M 7/49
363/132

(Continued)

OTHER PUBLICATIONS

Feb. 6, 2015 Search Report issued in International Patent Application No. PCT/US14/64617.
(Continued)

*Primary Examiner* — Jeffrey Zweizig
(74) *Attorney, Agent, or Firm* — Oliff PLC; R. Brian Drozd

(57) ABSTRACT

Methods and systems relating to a control system for an electrical energy outputting device are provided. The method may include receiving voltages from a plurality of power devices connected to a controller; identifying, by the controller in real time, relative levels of voltages output from each power devices; generating, by the system in real time, a waveform for each respective voltage of the power devices so that, for each cycle, power extracted from each generated waveform over a single waveform cycle is based the relative levels of voltages from each respective power device and so that the power level, for each cycle, from each waveform is higher than the power level of the other generated waveforms that have lower voltages; and summing, in real time, the generated waveforms to form an AC waveform.

20 Claims, 36 Drawing Sheets

(51) Int. Cl.
*H02M 7/44* (2006.01)
*H02J 3/16* (2006.01)
(52) U.S. Cl.
CPC .............. *H02J 3/16* (2013.01); *Y02E 10/563* (2013.01); *Y02E 40/34* (2013.01)

(56) References Cited

U.S. PATENT DOCUMENTS

| | | | | |
|---|---|---|---|---|
| 8,772,965 B2* | 7/2014 | El-Barbari | .............. | H02J 3/383 |
| | | | | 307/71 |
| 9,148,021 B2* | 9/2015 | Hsu | .......................... | H02J 3/383 |
| 2012/0146437 A1 | 6/2012 | Kernahan | | |
| 2012/0290145 A1 | 11/2012 | Joshi et al. | | |

OTHER PUBLICATIONS

Feb. 6, 2015 Written Opinion issued in International Patent Application No. PCT/US14/64617.

* cited by examiner

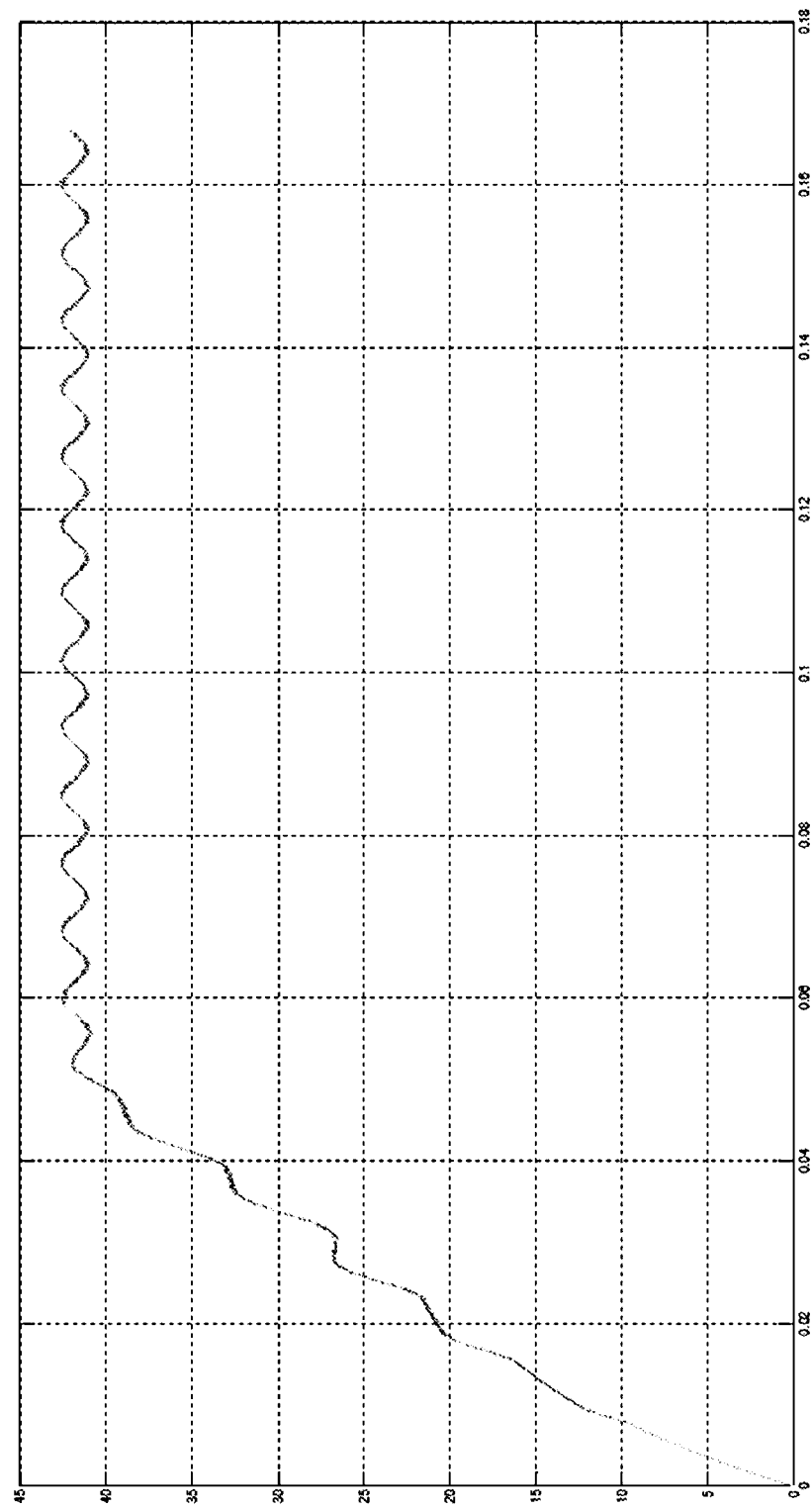

CONTROL SYSTEM FOR ELECTRICAL ENERGY OUTPUTTING DEVICE

CROSS-REFERENCE TO RELATED APPLICATIONS

The present application claims the benefit of priority to U.S. Provisional Application No. 61/901,084, filed on Nov. 7, 2013, which is incorporated herein by its entirety.

FIELD OF THE INVENTION

Embodiments of the present application relate to methods, systems and computer program products for interfacing DC power with AC power grids. One embodiment relates to minimally-intrusive methods and systems for converting DC voltage outputs of a plurality of solar panels to a quasi-square wave AC voltage that can be directly interfaced with an AC power grid or a load that is configured to receive an AC load.

BACKGROUND

The U.S. Department of Energy (DOE) estimates that $1/W installed photovoltaic solar energy system, equivalent to 5 cents/kWh, would make solar competitive with the wholesale rate of electricity without additional subsidies. Preliminary DOE analysis of required component costs to reach $1/W installed PV system implies the following breakdown: 50 cents/W for the module, 40 cents/W for the balance of system and installation, and 10 cents/W for power electronics. A typical commercially available solar panel rated for ~35 Vdc/7 Adc when operating at its maximum power point, thus establishes a target cost for power electronics at $20-$30 per panel. Thus, it is preferable to maximize the output of solar panels and other devices which generate power.

However, current systems, such as a plurality of solar panels connected together to generate an output, are inefficient in converting generated DC signals to an AC signal that can be used by a device or an AC power grid. Additionally, current systems are not robust because a point of failure in one of the connected output-generating devices causes the whole system to fail.

BRIEF SUMMARY OF THE INVENTION

In some embodiments, the present application is directed to a solar panel companion inverter system that provides energy yields similar to micro-inverters while restricting the bill of materials to a minimal level. In some embodiments, the solar panel companion inverter system converts the DC output of an individual photovoltaic panel to a quasi-square AC voltage, determines the step-width of individual quasi-square waveforms, and sequences all of them in a specific manner in real time so as to operate at maximum power point for given ambient conditions and synthesize a meaningful AC voltage that can be interfaced with the power grid.

In accordance with one embodiment, a method may include:
receiving voltages from a plurality of power devices connected to a controller;
identifying, by the controller in real time, relative levels of voltages output from each power devices;
generating, by the system in real time, a waveform for each respective voltage of the power devices so that, for each cycle, power extracted from each generated waveform over a single waveform cycle is based the relative levels of voltages from each respective power device and so that the power level, for each cycle, from each waveform is higher than the power level of the other generated waveforms that have lower voltages; and
summing, in real time, the generated waveforms to form an AC waveform.

In accordance with one embodiment, a system comprising:
a plurality of power devices;
a power conversion circuit connected to the respective outputs of the plurality of power devices; and
a controller connected to the plurality of power devices to control the output of the power conversion circuit;
wherein the controller identifies, in real time, levels of voltages output from each power device;
wherein the system generates, in real time, a waveform for each respective voltages of the power devices, wherein, for each cycle, power extracted from each waveform over a single cycle is based the relative levels of voltages from each respective power device so that the power level, for each cycle, from each waveform is higher than the currents of the other generated waveforms that have lower voltages; and
wherein the system sums, in real time, the generated quasi square waves to form an AC waveform.

In accordance with another embodiment, a method may include:
receiving voltages from a plurality of power devices connected to a controller;
identifying, by the controller in real time, relative levels of voltages output from each power device;
generating, by the system in real time, a waveform for each respective voltage of the power devices so that, for each cycle, power extracted from each generated waveform over a single waveform cycle is based the relative levels of voltages from each respective power device and so that the extracted power, for each cycle, from each waveform is higher than extracted power of the other generated waveforms that have lower voltages; and
summing, in real time, the generated waveforms to form an AC waveform.

BRIEF DESCRIPTION OF THE DRAWINGS

Aspects of the present invention is further described in the detailed description which follows in reference to the noted plurality of drawings by way of non-limiting examples of embodiments of the present invention in which like reference numerals represent similar parts throughout the several views of the drawings and wherein:

FIG. 11B illustrates an example of photovoltaic panel voltages under uniform irradiance conditions according to various embodiments of the present invention.

DETAILED DESCRIPTION

Figure 1:
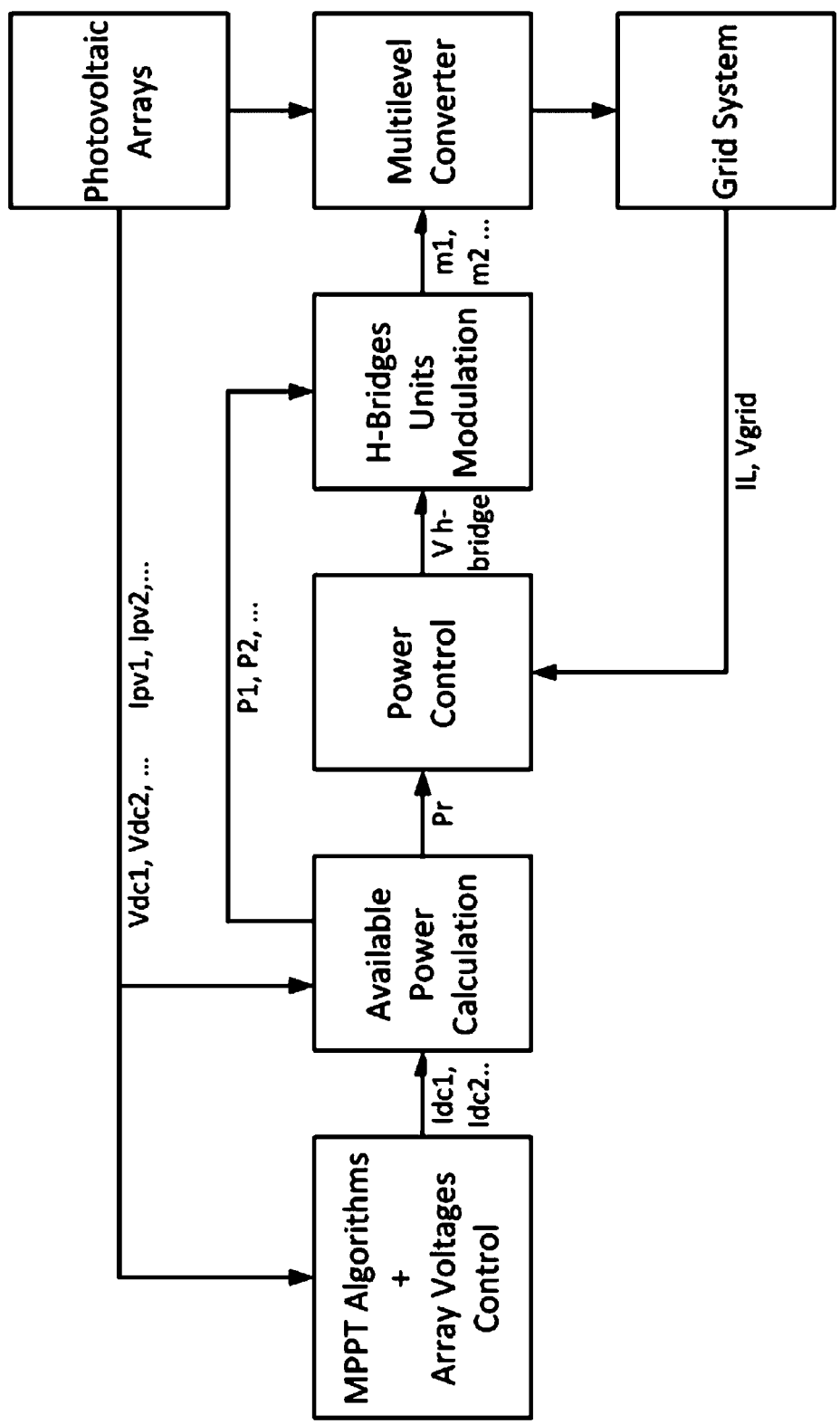
FIG. 1 illustrates a control scheme adopted in H-bridge multilevel inverters employed for grid-connected PV systems.

The present invention now will be described more fully hereinafter in the following detailed description of the invention, in which some, but not all embodiments of the invention are explicitly described. Indeed, this invention may be embodied in many different forms and should not be construed as limited to the embodiments set forth herein; rather, these embodiments are provided so that this disclosure will satisfy applicable legal requirements.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Discussed below is a control system for an electrical energy outputting device. The electrical energy outputting device may be any device which can harvest, generate or output electrical energy. For example, a solar panel receives electrical energy from the sun and converts the sun's heat waves into electrical voltage. Also, wind farms convert wind into electrical energy. In any event, there are numerous electrical energy outputting systems that the present invention is applicable. However, the present application is described below with respect to solar panels for ease of describing embodiments of the invention. It should be understood that the present application should not be limited to solar panels and that the concepts presented herein can be applied to any output device.

According to one embodiment, a micro-inverter may be employed for every solar panel. Such small inverters convert DC electricity produced by a single solar panel and synthesize AC voltage required by the load or by the grid (when grid-tied). This approach is advantageous because it has panel-level Maximum Power Point Tracking (MPPT) and thus increased yield potential because one shadowed solar panel does not drag down the whole string of solar panels, and increased system availability because a single malfunctioning solar panel does not have large impact on the entire array. However, it is disadvantageous in that there is a higher cost on per watt basis, and increased complexity in installation because of multiple units.

According to another embodiment, string inverters may be employed because they are smaller than central inverters and process power from only one string of solar panels. This approach is advantageous because it has a higher overall efficiency than micro-inverters, and there is no single point of failure as in central inverter. Yet, string inverters may be disadvantageous in that there is no panel-level Maximum Power Point Tracking (MPPT), and string inverters are larger than micro-inverters and do not interface with each panel on an individual basis.

According to another embodiment, H-bridge multilevel inverters are discussed herein as a means to interface individual solar panels with an AC power grid. The present application proposes variations of classical multilevel sinusoidal Pulse Width Modulation (PWM) techniques to realize panel-level MPPT. The reference signals to this modulator are provided by a current controller, the phase of which is synchronized with the grid via a Phase Locked Loop (PLL). The current amplitude reference is derived through conventional DC bus voltage control with an outer MPPT control loop. A simplified schematic of a representative control scheme reported in is shown in FIG. 1.

Figure 2:
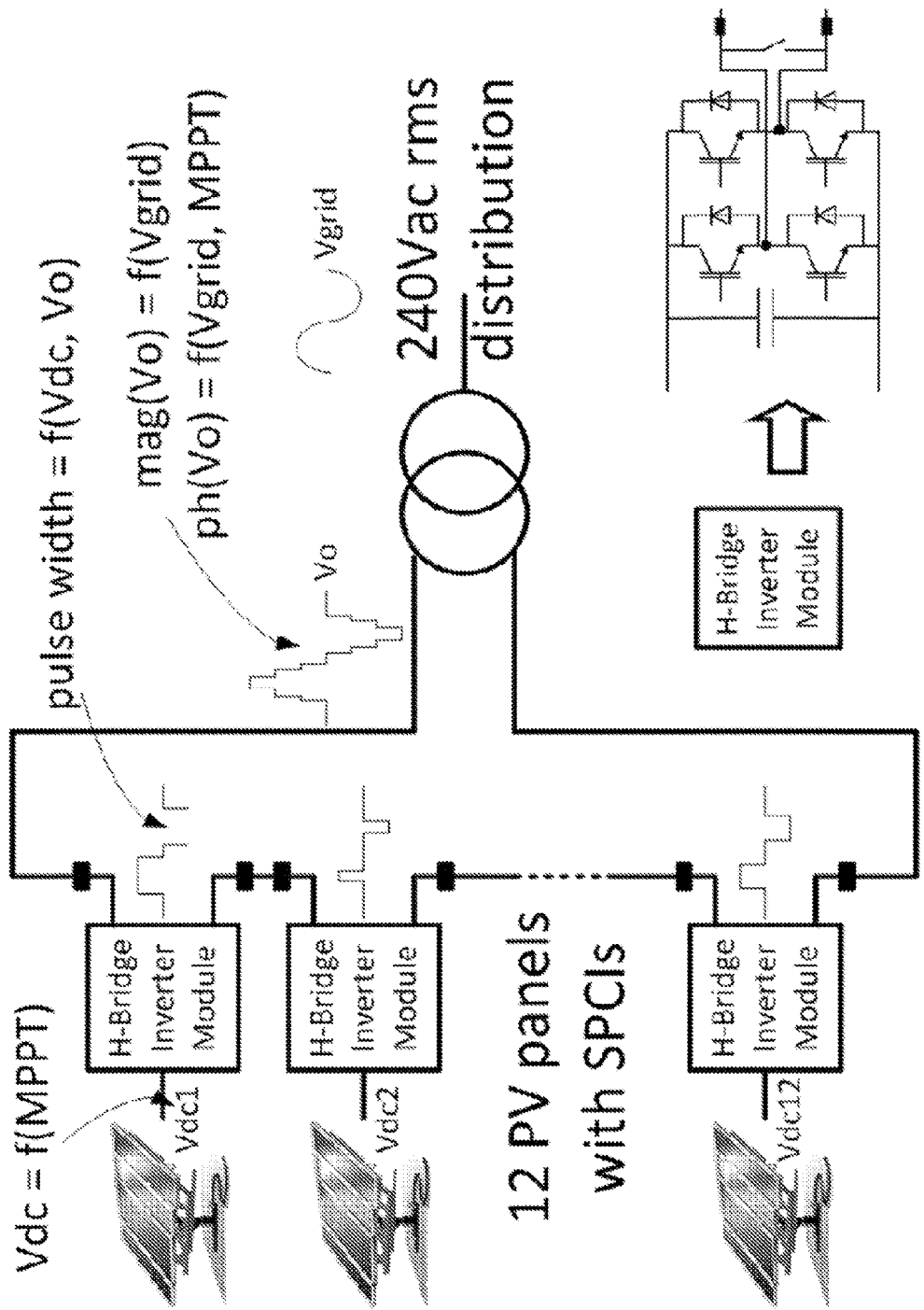
FIG. 2 shows a simplified schematic of the proposed Solar Panel Companion Inverter (SPCI) system according to various embodiments of the present invention.

The Solar Panel Companion Inverter (SPCI) is fundamentally different in the way it is being implemented. Driven by aggressive cost targets of 10 cents/W, each H-bridge inverter module is reduced to four power electronic devices, such as Metal Oxide Semiconductor Field Effect Transistors (MOSFETs), one mechanical bypass switch, one DC link capacitor, one microcontroller and a parasitic power supply harvesting energy from the solar panel itself. As shown in FIG. 2, this inverter module is integrated with each panel (hence the name "companion" inverter), and depending on the dc voltage of the panel, a quasi—square wave of required duration is synthesized. To realize a required ac voltage, a number of such panels are connected in series through their companion inverters. The schematic to synthesize a 120V AC rms voltage is shown in FIG. 2, wherein six panels, each capable of producing a dc voltage of about 35V are connected in series through their corresponding companion inverters and are interfaced with the distribution grid via an isolation transformer.

As may be seen from FIG. 2, the required magnitude of the output AC waveform, mag(Vo), to be synthesized by the PV generation system is a function of the distribution grid voltage and the voltage drop across the interfacing transformer. Typically, magnitudes of AC voltages on both sides of the transformer are synchronized such that only real power is supplied from the panel to the grid. However, it is also possible to add a component for reactive power required to support the grid in the process of determining mag(Vo). This feature of reactive power support in addition to real power transfer is explained herein as well. The phase of output AC waveform, ph(Vo), is synchronized with the grid and governed by the available maximum power in the photovoltaic ("PV") generation system. Once such reference output AC voltage Vo is determined from mag(Vo) and ph(Vo), the SPCI controller constructs this required waveform from multiple panel level quasi-square voltages.

Towards this, maximum output power point of operation (both voltage and current) for ambient irradiance and temperature is determined for each panel. A reference output AC current is calculated from the available maximum power and reference Vo. Then, each H-bridge inverter is switched such that the reflected DC current drawn from each panel tracks the maximum power point for that panel. The reference current is multiplied with the impedance of the interfacing transformer, to obtain the voltage drop across it. Phasor sum of voltage drop across the transformer and the grid voltage is done to obtain the reference voltage. Furthermore, based on individual panel DC voltages, all H-bridge inverter outputs are sorted and sequenced in real-time such that the overall AC output voltage follows the required reference Vo.

It is noted that the outputs of the H-bridge inverters are not all output at the same time; instead, they are modified and then superimposed onto each other to form an AC signal. The amount of modification and then which parts of the output signals are superimposed are discussed in more detail below.

Figure 3A:
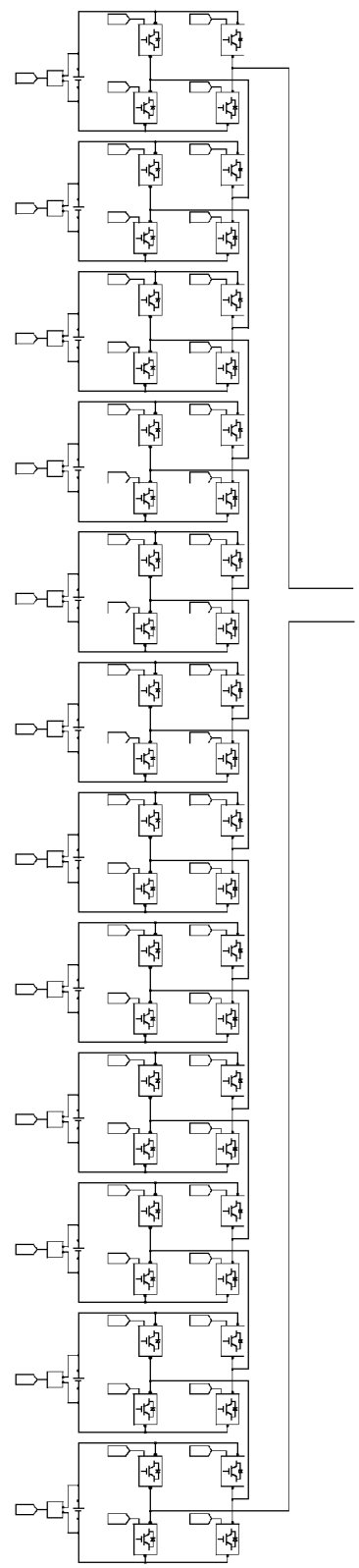
FIG. 3A depicts a simplified circuit schematic of a proposed 25-level SPCI system for 240 Vac applications according to various embodiments of the present invention.
Figure 3B:
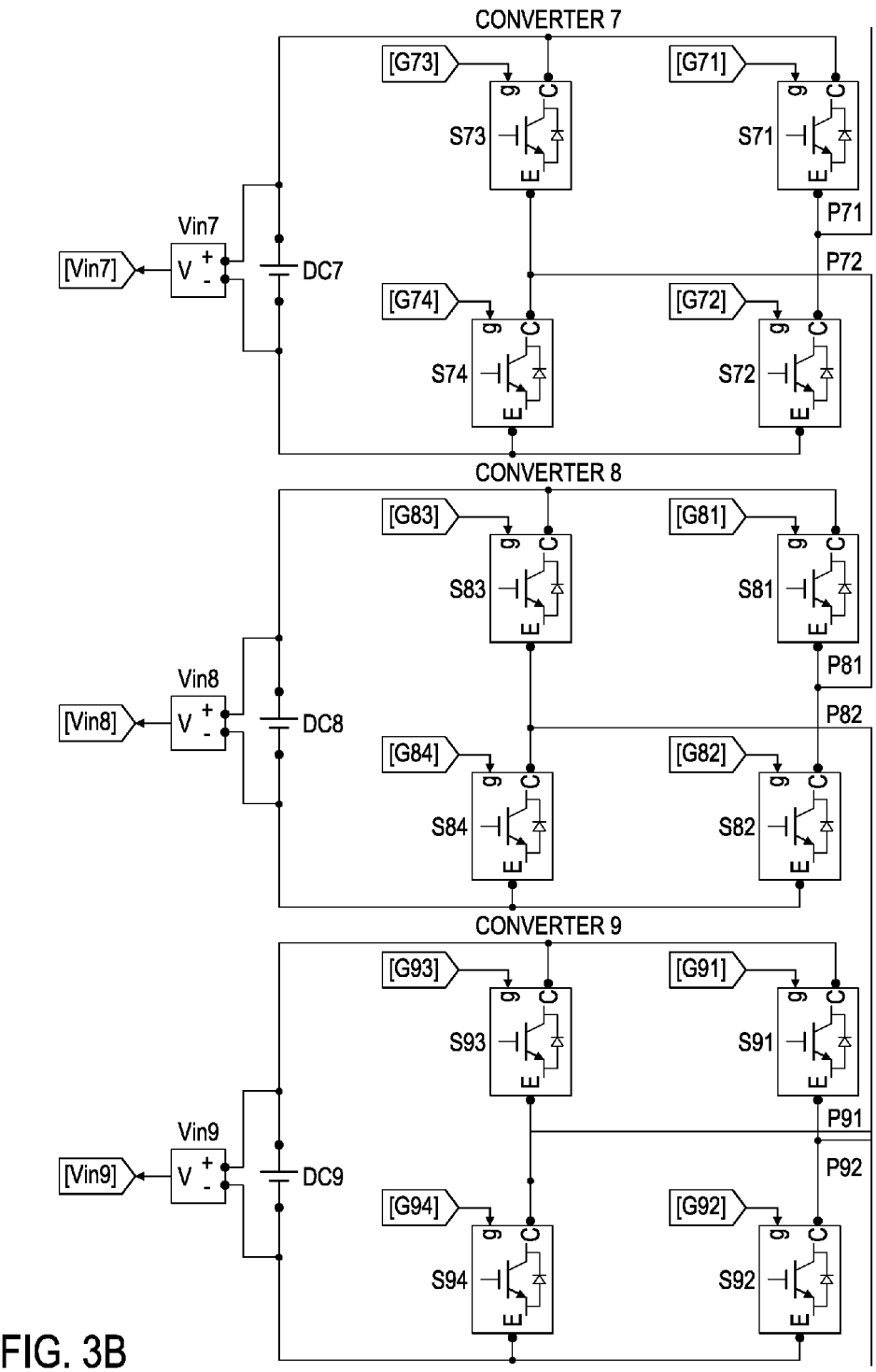
FIG. 3B illustrates a simplified circuit schematic of representative three intermediate inverters in the proposed 25-level SPCI system for 240 Vac applications according to various embodiments of the present invention.
Figure 3C:
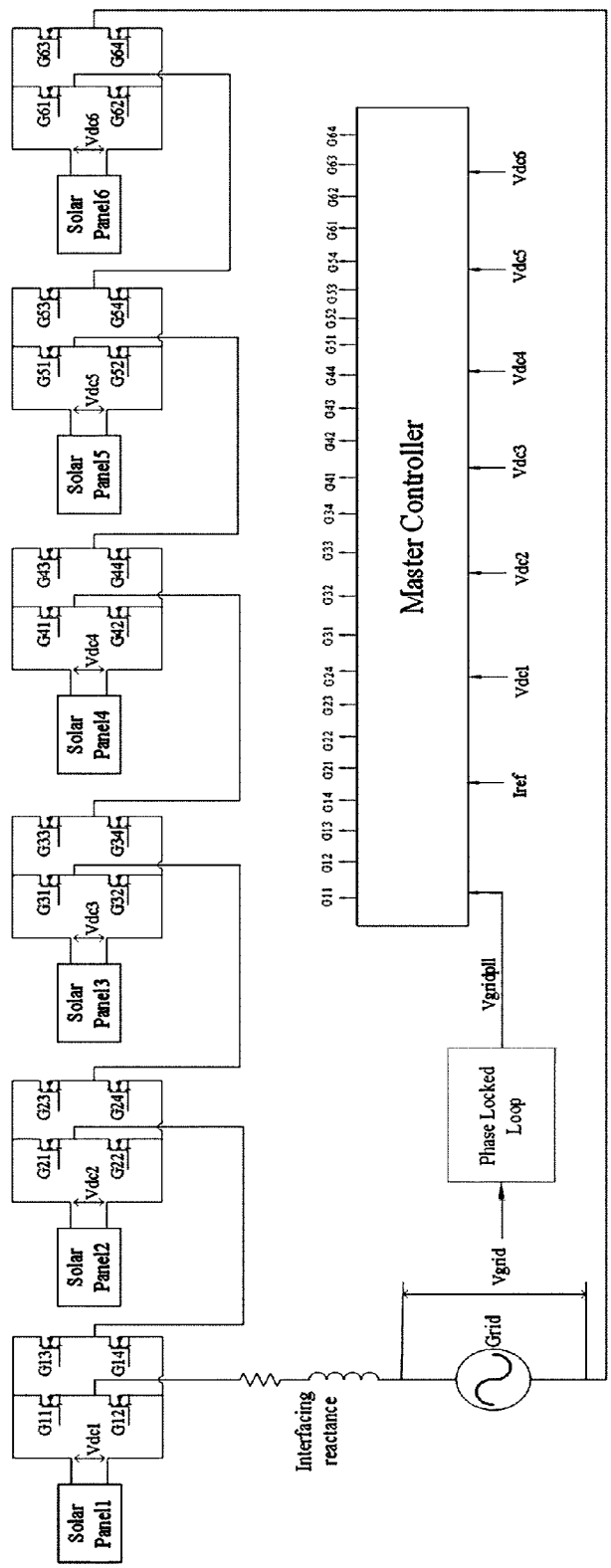
FIG. 3C illustrates a detailed circuit schematic of Solar Panel Companion Inverter (SPCI) according to various embodiments of the present invention.

FIG. 3C illustrates a detailed circuit schematic of Solar Panel Companion Inverter (SPCI). The schematic consists of an SPCI connected to a 120V ac rms grid, a Phase Locked Loop (PLL) block which is used as a means to synchronize the output voltage of SPCI with the grid. The grid voltage is measured and fed into the PLL to construct the image of grid voltage, $V_{gridpll}$. As discussed above, six panels are connected in series through their individual H—bridges. Each H—bridge consists of four MOSFETs, which are closed/opened by means of the triggering pulses given to their gate terminals. $G_{11}$, $G_{12}$, $G_{13}$, and $G_{14}$, through $G_{61}$, $G_{62}$, $G_{63}$, and $G_{64}$ are the gate signals applied to the MOSFETs in H—bridges connected to Solar Panel1 through Solar Panel6. The master controller controls the pulse generation to close/open the MOSFETs and it is programmed to generate pulses for triggering the MOSFETs. Timing and width of the pulses is determined by the controller, based on input parameters. The input signals to the master controller $V_{dc1}$, $V_{dc2}$, $V_{dc3}$, $V_{dc4}$, $V_{dc5}$ and $V_{dc6}$ are the dc voltages measured across Solar Panel1, Solar Panel2, Solar Panel3, Solar Panel4, Solar Panel5, and Solar Panel6 respectively. $V_{gridpll}$, and reference current, $I_{ref}$, are the two other input signals to the master controller. These eight input signals of the controller are processed in real time and pulses are generated. Its outputs are gate pulses, $G_{11}$ through $G_{64}$. $I_{ref}$ is the parameter which determines operation of the system at maximum power point. The value of $I_{ref}$ which determines the maximum power point operation varies with the operating scenarios of the SPCI system.

FIGS. 3A-3B illustrates a schematic of a single phase 240 Vac grid interface system based on the solar panel companion inverter system according to one embodiment. This exemplary system includes twelve H-bridge inverter modules that intertie twelve independent, isolated DC sources and interface the combined AC output with a 240 Vac power grid. As may be seen from FIG. 3A, twelve H-bridge inverters are connected in series to form a two-wire single phase output. Each H-bridge inverter consists of four power semiconductor switches as shown in the three inter-connected H-bridge inverters of FIG. 3B. Each module derives power from a DC source (e.g., a solar panel or other source which generates DC power).

Figure 4A:
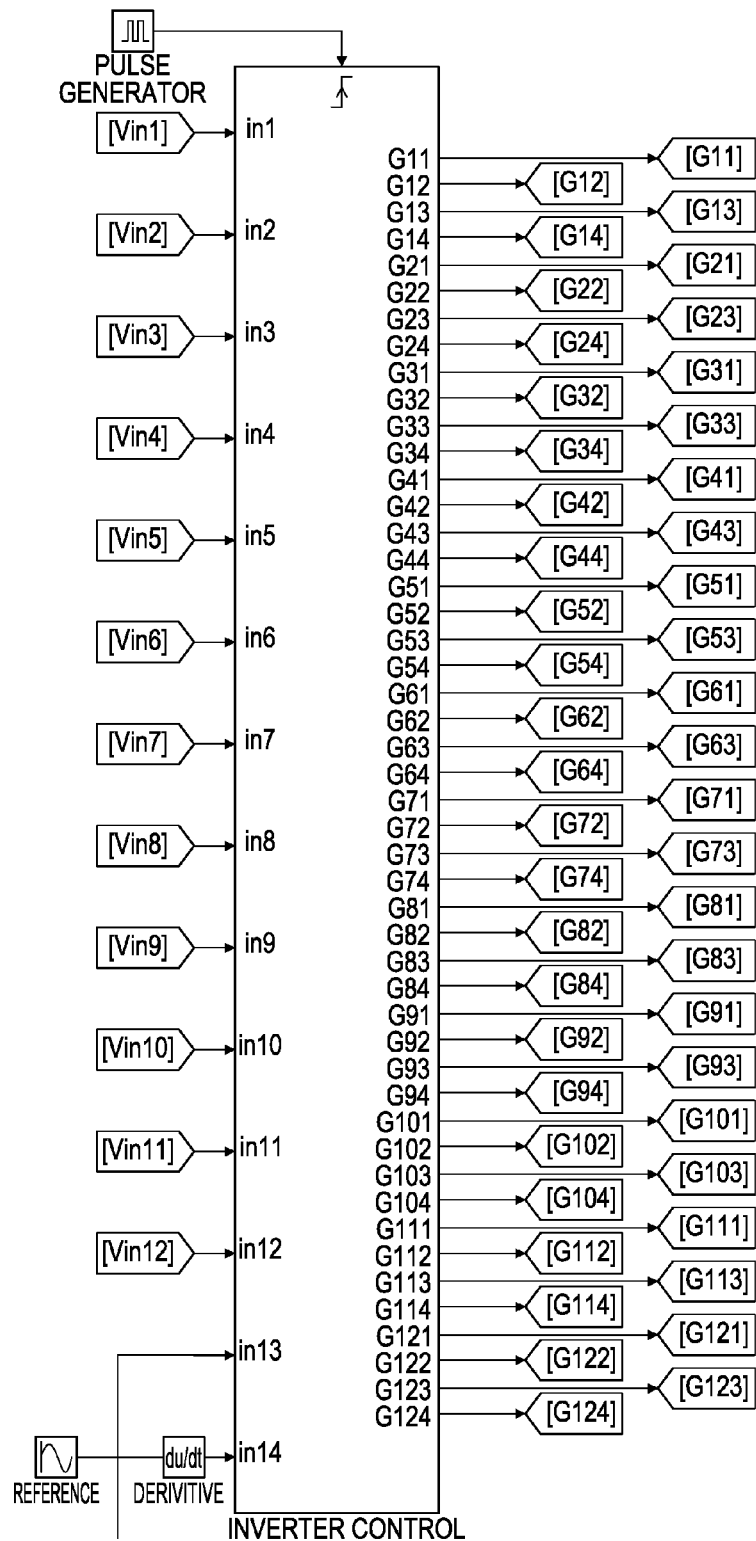
FIG. 4A illustrates a schematic of the central controller employed for the proposed 25-level SPCI system according to various embodiments of the present invention.

The forty eight switches in the system may be driven by a central controller as shown in FIG. 4A. This controller is modeled as a triggered system to reproduce effects of a digital controller. The inputs to the controller of FIG. 4A are twelve DC bus voltages and one reference AC output voltage. The outputs of the controller of FIG. 4A are forty eight gate signals that are transmitted to an individual power device such as a power grid.

Figure 4B:
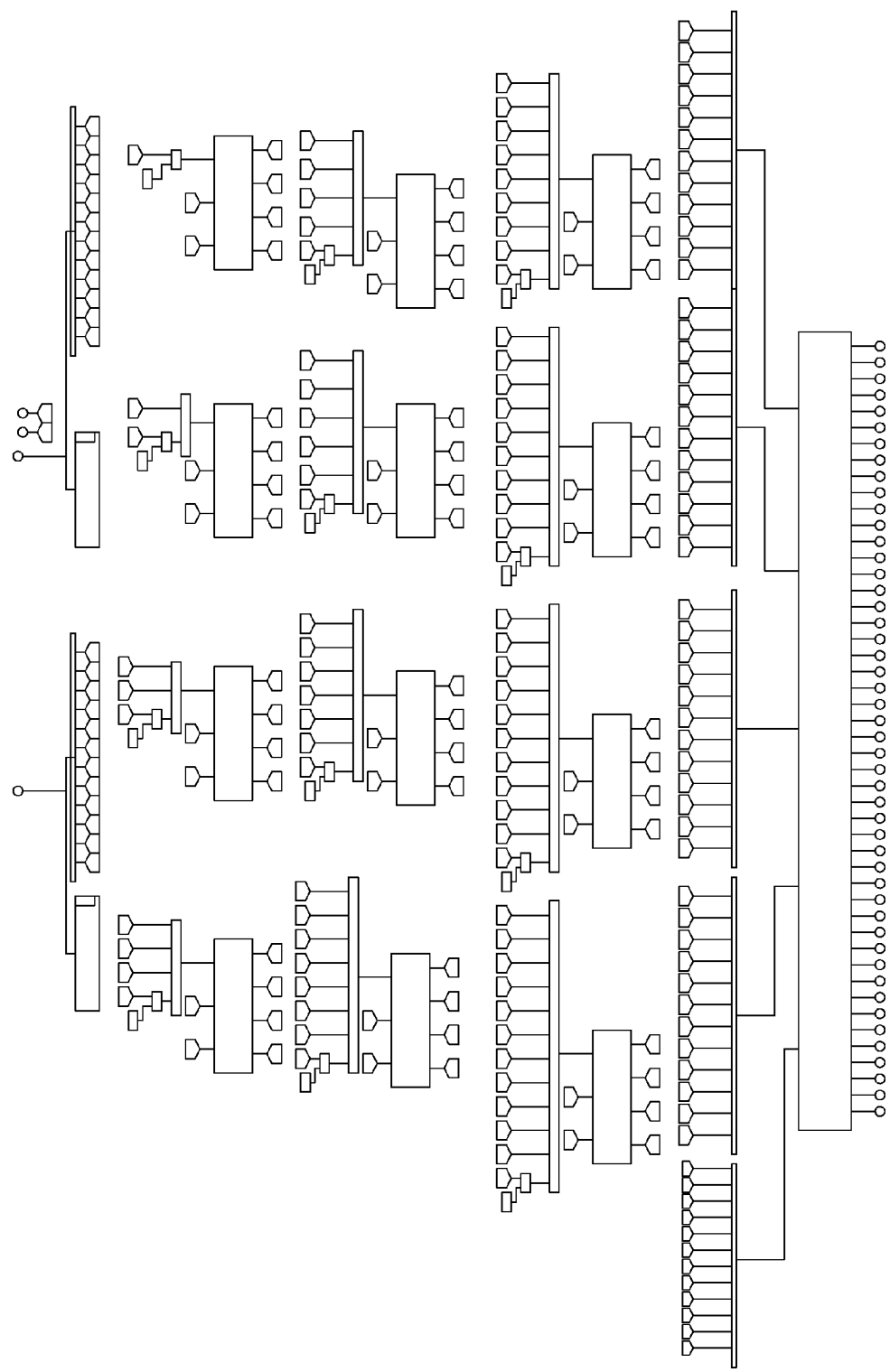
FIG. 4B shows a schematic of the distributed controllers employed for the proposed 25-level SPCI system according to various embodiments of the present invention.
Figure 4C:
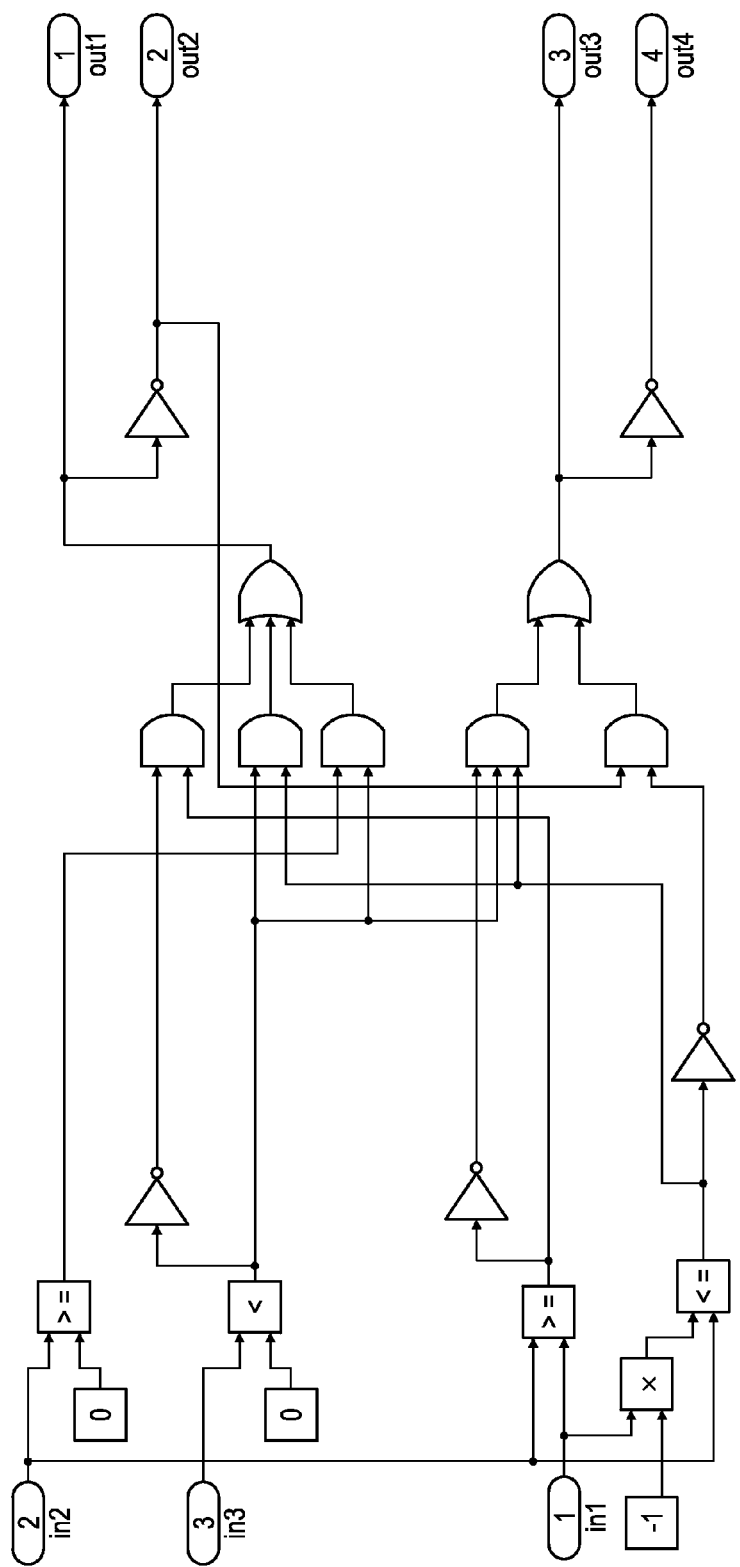
FIG. 4C shows a schematic of the logic circuit employed to generate pulses for individual H-bridges in the proposed 25-level SPCI system according to various embodiments of the present invention.
Figure 5A:
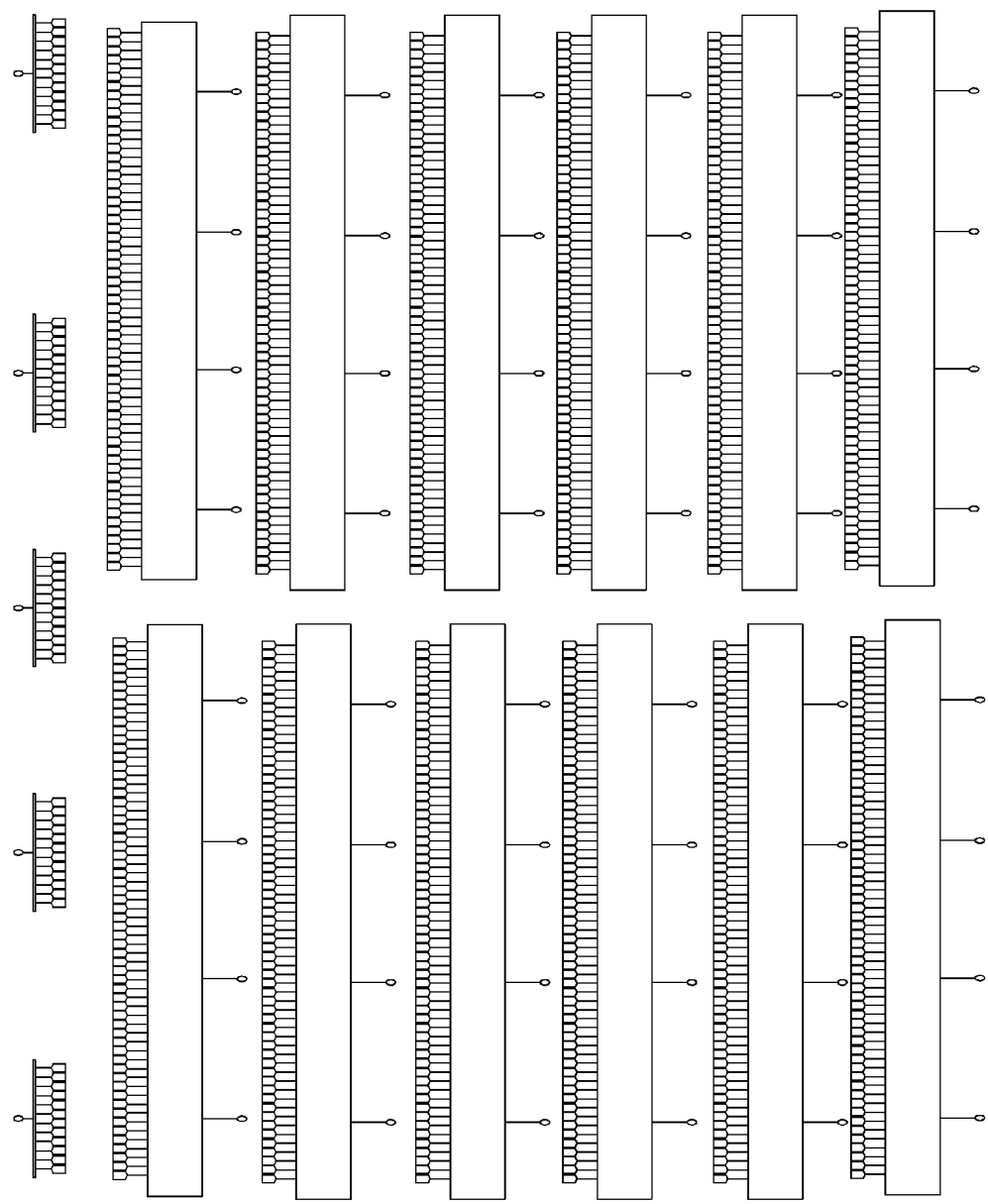
FIG. 5A represents a simplified schematic of the 12 distributed gate sorter and sequencers employed for the proposed 25-level SPCI system according to various embodiments of the present invention.
Figure 5B:
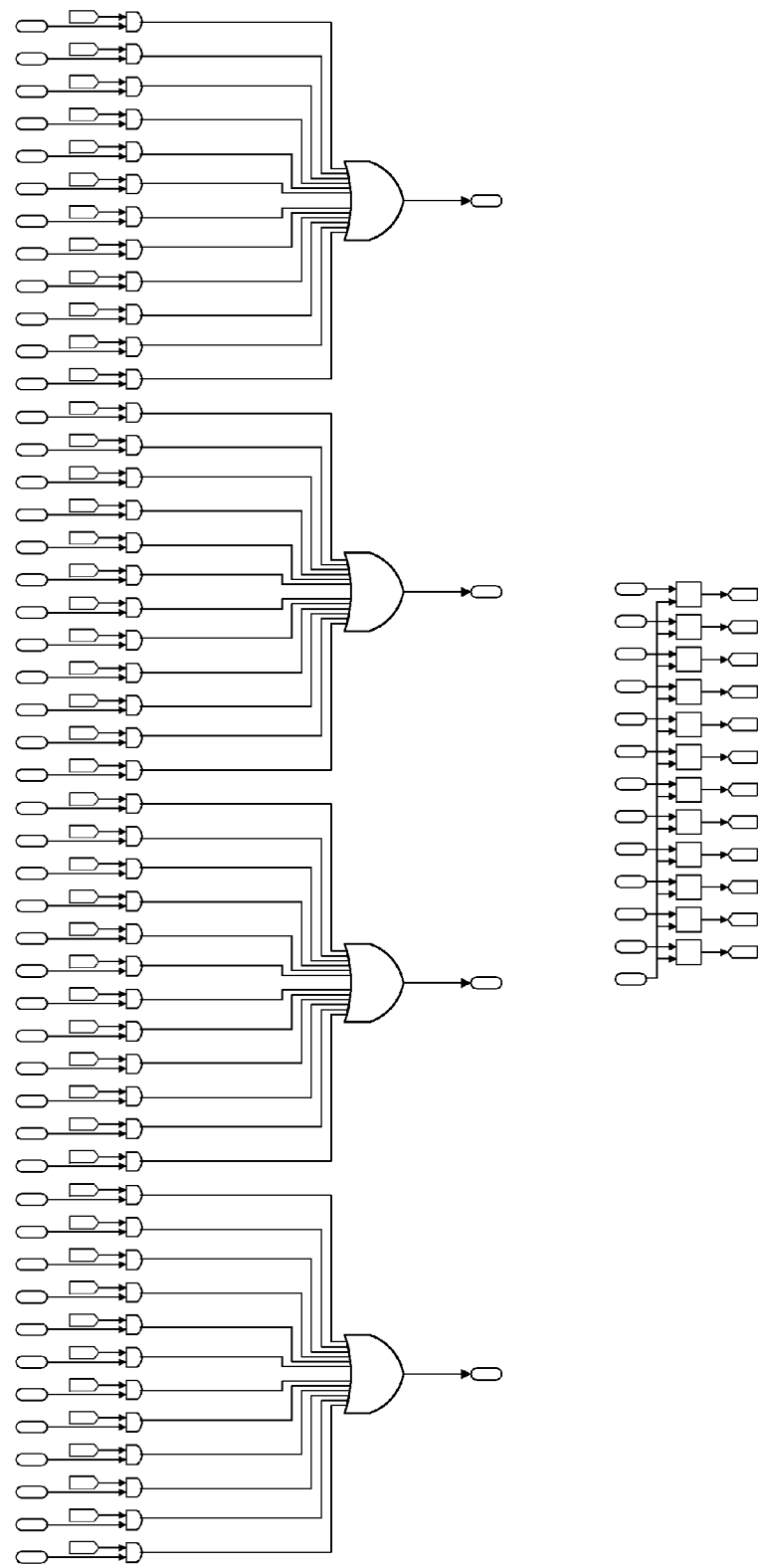
FIG. 5B shows a simplified schematic of the logic circuit employed to sort and sequence individual H-bridges in the proposed 25-level SPCI system according to various embodiments of the present invention.

FIG. 4B illustrates twelve distributed controllers that generate pulses for each H-bridge. The digital logic employed inside each of the twelve distributed controllers to generate four gate pulses is shown in FIG. 4C. These four gate pulses from each distributed controller are further passed through distributed gate sorter and sequencing sub-systems as shown in FIGS. 5A-5B. This sort and sequence routine is designed to determine the place of each individual H-bridge in the overall stack of multilevel AC output waveform. The digital logic employed to accomplish this sequencing is shown in FIG. 5B.

Described below are detailed descriptions of various control strategies including: Classical Pulse Width Modulation (CPWM), Multilevel Sort and Stack Modulation (MSSM), and Multilevel Pulse Width Modulation (MPWM) are explained respective sections below.

Classical Pulse Width Modulation

Figure 21:
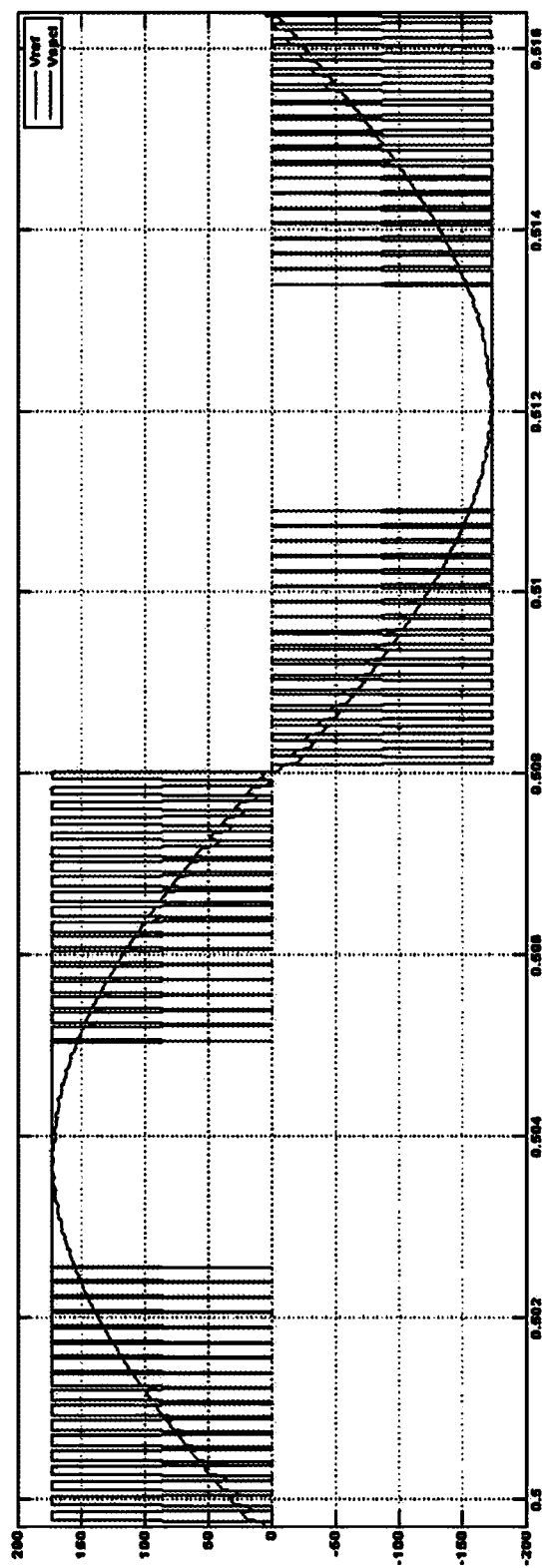
FIG. 21 illustrates a graph of a synthesized classical pulse width modulated output AC voltage with its sinusoidal reference, according to an embodiment.
Figure 22:
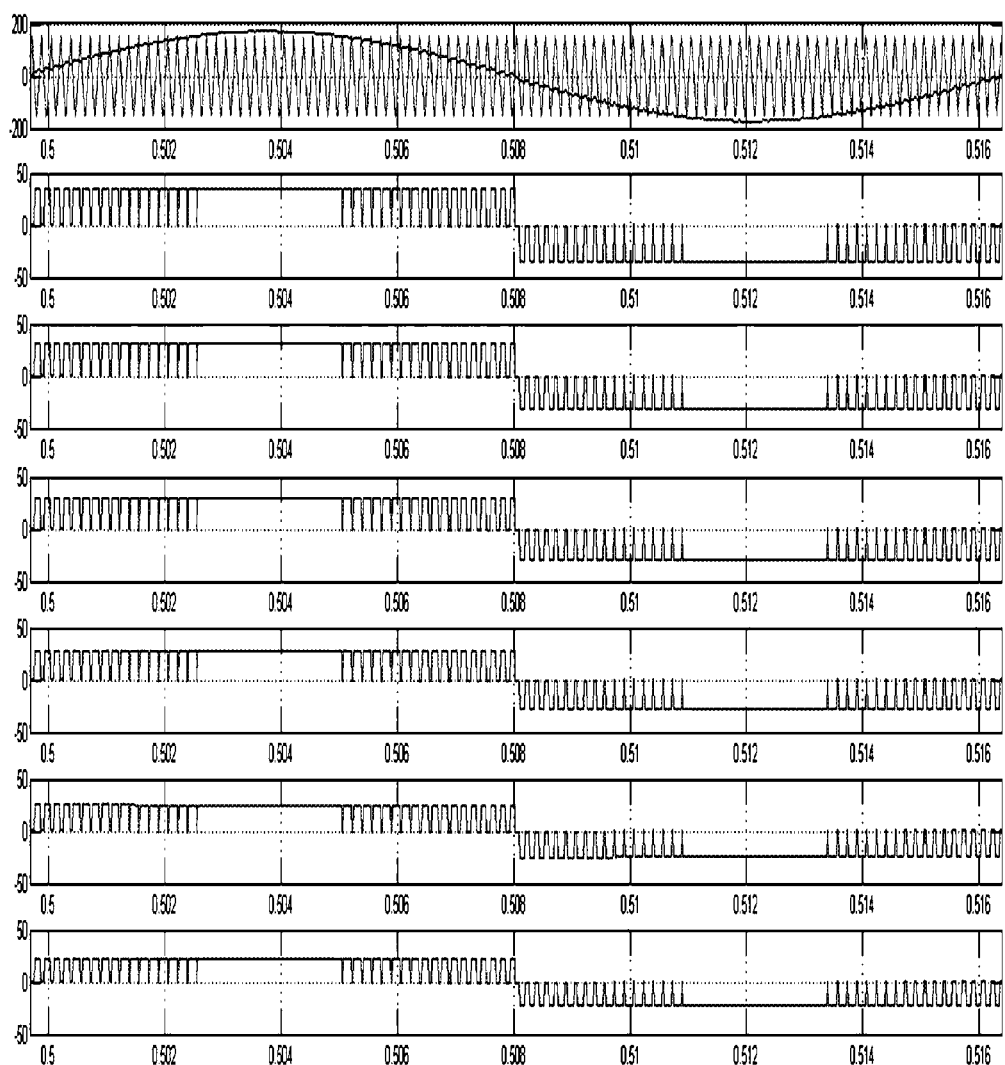
FIG. 22 illustrates graphs showing a comparison of sinusoidal reference wave with high frequency triangular wave, and the output voltage across each H—bridge in SPCI, according to an embodiment.

In Classical Pulse Width Modulation (CPWM), a comparison is made between sinusoidal reference wave and a high frequency (e.g., 6 kHz) triangular wave, also called carrier wave, and a pulse width modulated alternating voltage is produced by summing a series of switched quasi-square waves modulated by triangle waves. The amplitude of the triangular wave is set to the sum of voltages across all the solar panels. The synthesized classical pulse width modulated output AC voltage with its sinusoidal reference is shown in FIG. 21. The CPWM which is implemented for central inverter topology can also be identically implemented for SPCI, wherein each H—bridge module is provided with the corresponding CPWM signals. Since all the H—bridges are connected in series, at any switching instance, pulse width modulated output voltage similar to the one shown in FIG. 21 can be synthesized with SPCI. A comparison of sinusoidal reference wave with high frequency triangular wave, and the output voltage across each H—bridge in SPCI is shown in FIG. 22.

Multilevel Sort and Stack Modulation

Figure 23:
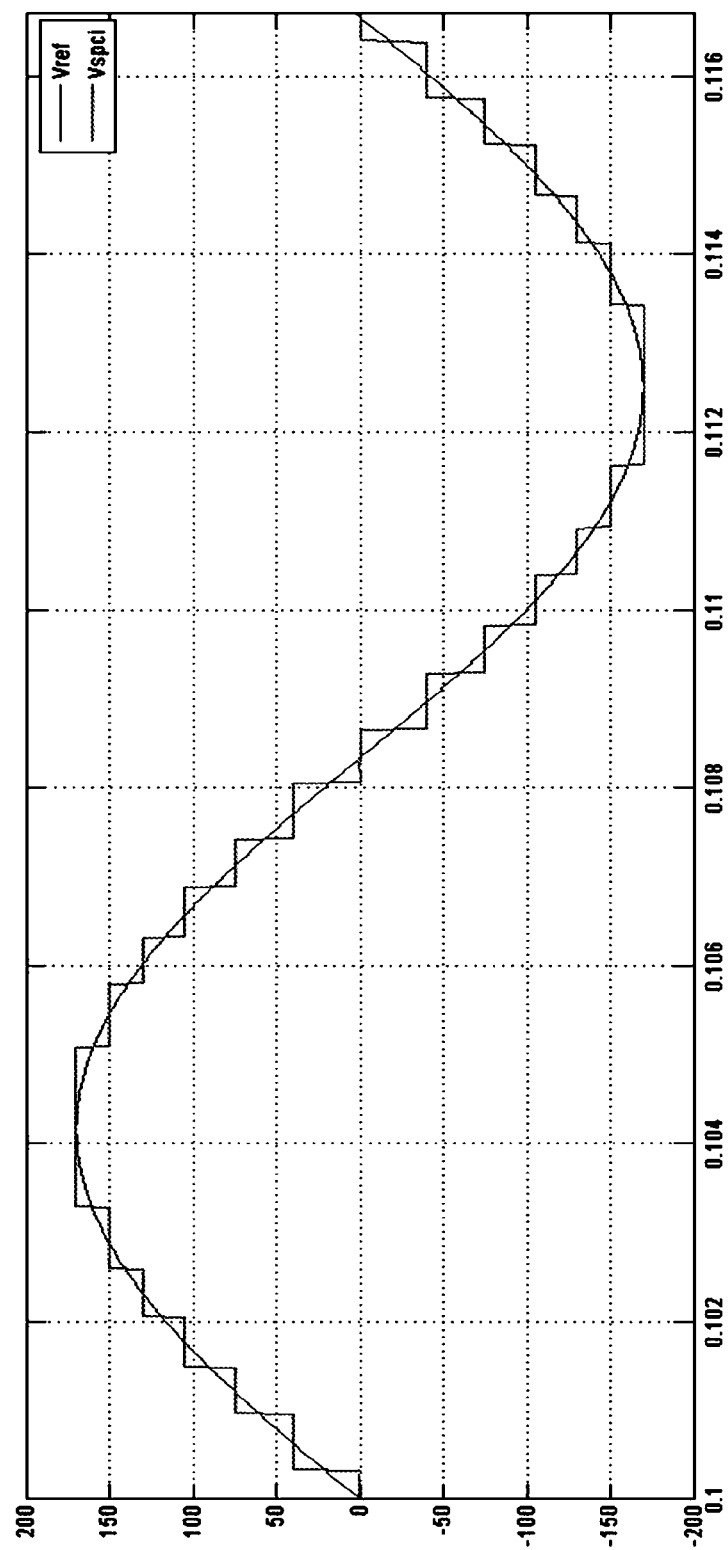
FIG. 23 illustrates a graph of a generated output AC voltage using Multilevel Sort and Stack Modulation with its sinusoidal reference, according to an embodiment.

To synthesize an AC wave as shown in FIG. 23, Multilevel Sort and Stack Modulation (MSSM) is implemented for Solar Panel Companion Inverter (SPCI) topology. The DC voltages are measured from all panels and are sorted in descending order. Then the inverter connected to the panel with largest voltage is selected to synthesize the first switched quasi-square wave of the output staircase waveform. Because the width of the step of a first quasi-square wave is the longest or widest of all panels, this action results in drawing maximum current from this particular panel, thereby consequently decreasing the voltage on the I-V curve of the solar panel. The inverter connected to the panel with the second largest voltage is selected to synthesize the next step on the output waveform and this sequence is repeated for all the available inverters. The width of each step is a function of the switching instance in the resulting quasi—square wave (e.g., a square wave that goes from zero to a high level and back to zero). This switching time instance is determined to be that moment of time when the reference voltage is more than the sum of all previous steps plus half of existing step. Such logic results in a symmetrical staircase waveform around any sinusoidal reference. Switching instances for all the steps is shown by a dot on the sine wave, in FIG. 24. For instance, for each half-sine wave graph, there is a corresponding quasi-square wave graph having a width measured from the dots on the half-sine wave graph. The quasi-square wave graph from top left has the longest width, the middle left quasi-square wave graph has the next longest width, and so on until the bottom righthand quasi-square wave graph has the smallest width. These widths correspond to the voltage amounts produced by each solar panel. The higher the voltage, the wider the width of the quasi-square wave graph that will be generated. In any event, each resulting quasi-square wave graph has a different width, according to one embodiment, so that when the quasi-square wave graphs are added together, an AC waveform will be generated (as discussed later in more depth).

Figure 24:
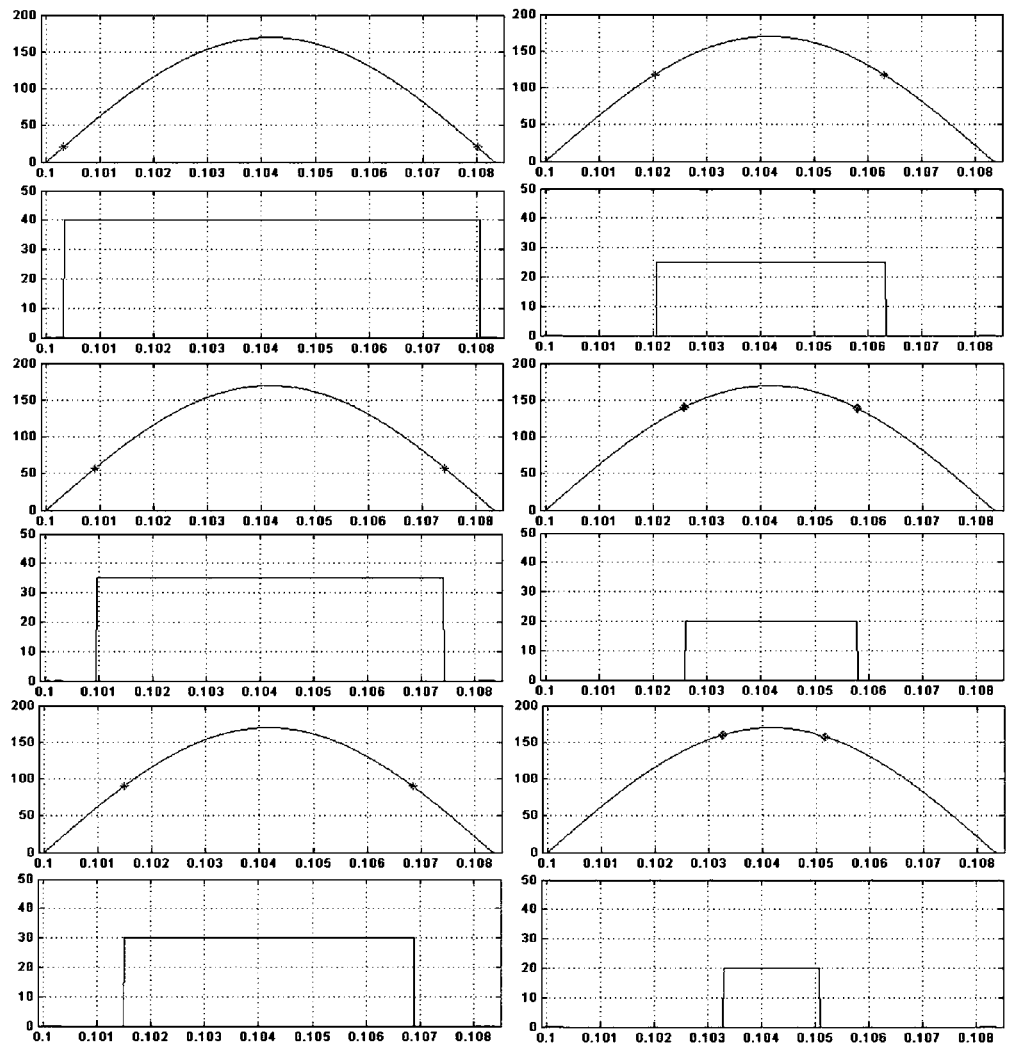
FIG. 24 illustrates graphs of generating quasi square waves from corresponding outputs of the electrical energy output device, according to an embodiment.

As shown in FIG. 24, the width of the step of each inverter is a function of the switching instance in the resultant quasi-square wave. This switching time instance is determined to be that moment of time when the reference voltage is more than the sum total of all previous steps plus half of existing step. Such logic results in a symmetrical staircase waveform around any sinusoidal reference.

Multilevel Pulse Width Modulation

Figure 25:
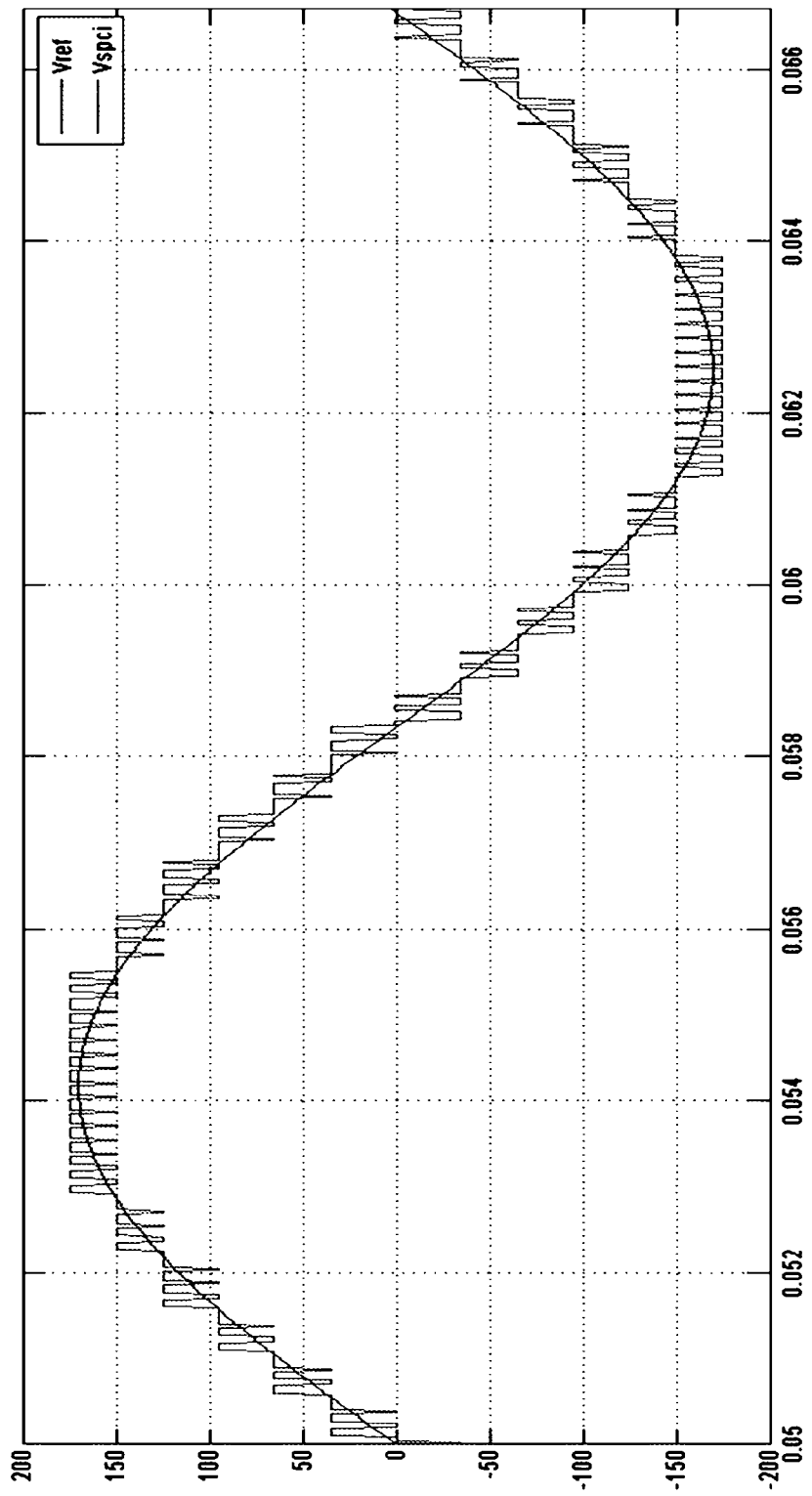
FIG. 25 illustrates a graph of a generated output AC voltage using Multilevel Sort and Stack Modulation with its sinusoidal reference, according to an embodiment.
Figure 26:
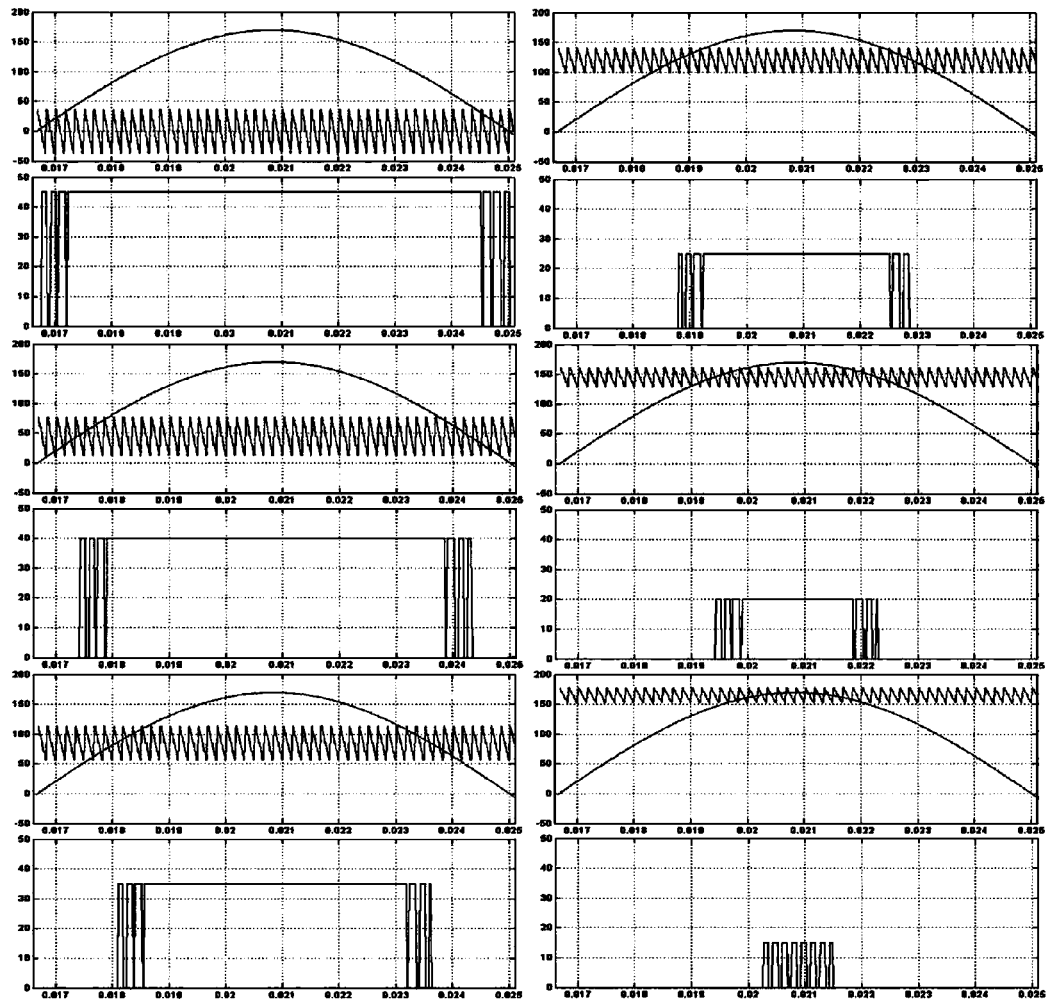
FIG. 26 illustrates graphs of generating a quasi square-wave synthesized with a triangular wave, as compared to a sine wave reference, according to an embodiment.

To synthesize an AC wave as shown in FIG. 25, Multilevel Pulse Width Modulation (MPWM) is implemented for (Solar Panel Companion Inverter) SPCI topology. MPWM is a combination of both MSSM and CPWM strategies. Similar to MSSM, in MPWM strategy also the dc voltages of all the panels are measured, sorted in descending order and the one with the largest voltage is selected to synthesize the first pulse width modulated switched quasi—square wave. In order to synthesize this, a triangular wave having high frequency (6 kHz) and an amplitude equal to the value of the selected DC bus voltage, is compared to the sine wave reference, as shown in FIG. 26. The inverter connected to the second largest panel is selected to synthesize the second pulse width modulated step. In this case, the carrier frequency is shifted in level by a value equal to magnitude of the first step. The sequence is repeated for all the available inverters and in doing so, the carrier frequency is shifted in level by a value equal to the sum of magnitudes of all the previous steps.

Implementing Classical Pulse Width Modulation (CPWM) for a Solar Panel Companion Inverter (SPCI) generates a three level pulse width modulated sinusoidal output voltage. Multilevel Sort and Stack Modulation (MSSM) is based on sorting the DC voltages of all panels to generate voltage levels at fundamental frequency (60 Hz). When MSSM is implemented for SPCI, it generates a multilevel stacked output voltage. Multilevel Pulse Width Modulation (MPWM) is a combination of CPWM and MSSM, when implemented for SPCI, generates a multilevel pulse width modulated output waveform. For an operating scenario, only one of the control strategies yields the best (as will be discussed in Chapter 7). Since all the three control strategies can be implemented for SPCI, depending on the yield, one control strategy which yields the best is selected. This selection occurs in real-time in order to dynamically optimize yield as irradiance and panel conditions vary.

Figure 6A:
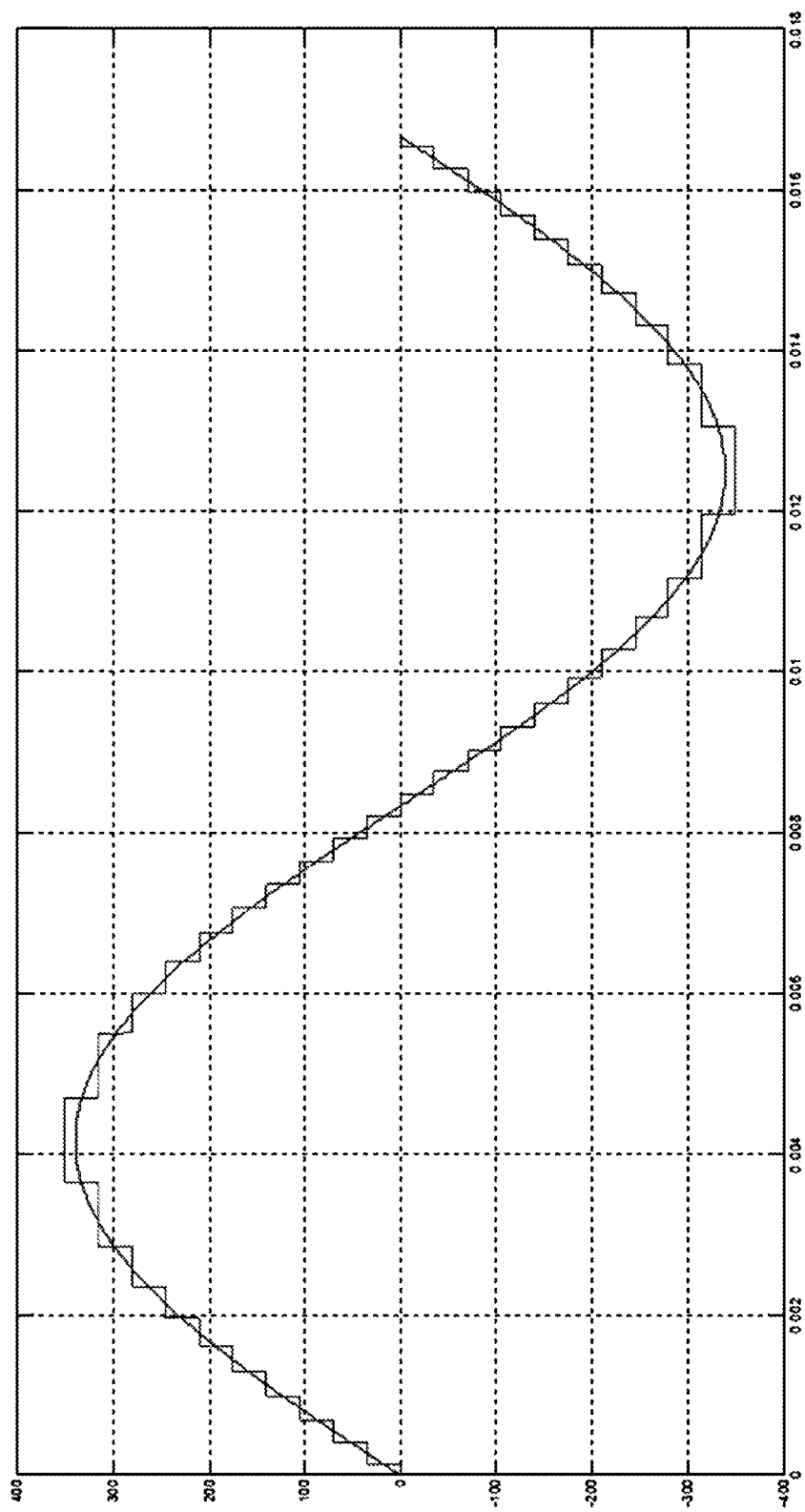
FIG. 6A illustrates output voltage of the proposed SPCI system under uniform irradiance conditions where all DC voltages are equal according to various embodiments of the present invention.
Figure 6B:
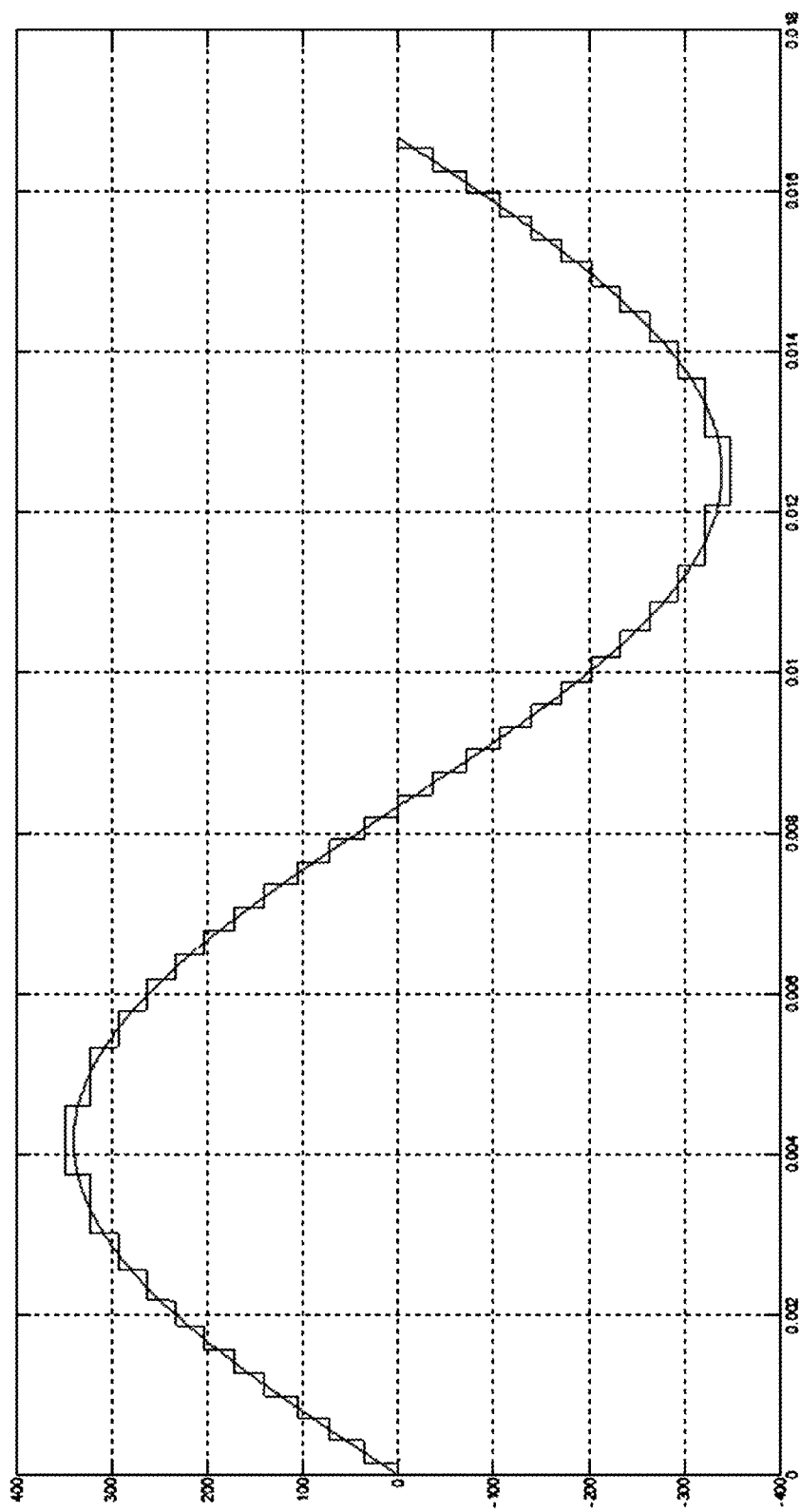
FIG. 6B shows the output voltage of the proposed SPCI system under mild non-uniform irradiance conditions where the DC voltages are variable according to various embodiments of the present invention.
Figure 6C:
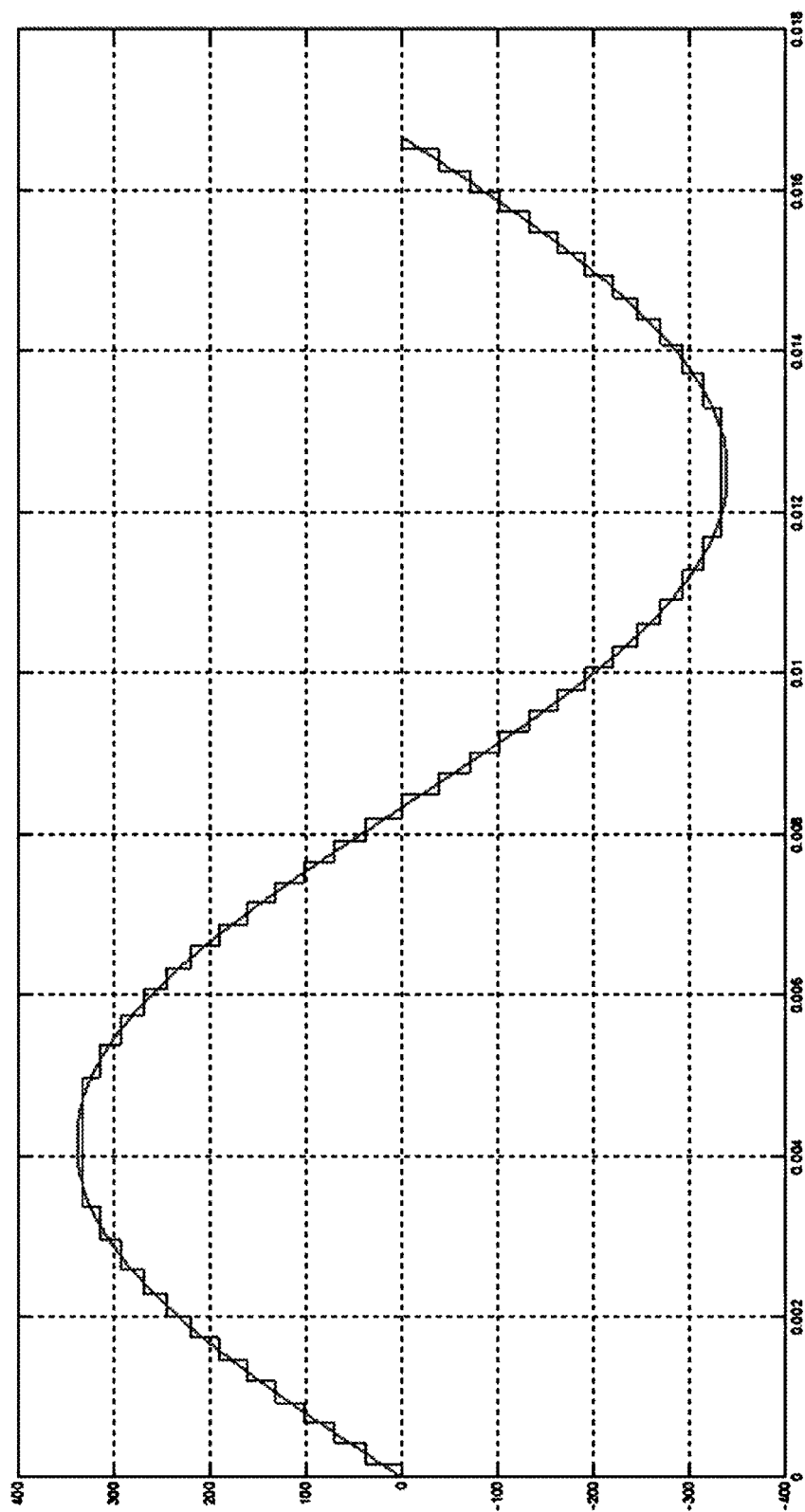
FIG. 6C depicts output voltage of the proposed SPCI system under severe non-uniform irradiance and dirt conditions—DC voltages vary between 18-40 Vdc, all 12 panels contribute to form 25-level AC waveform to synthesize 240 Vac rms according to various embodiments of the present invention.

Referring now to FIGS. 6A, 6B, and 6C, sample staircase waveforms generated with varying DC voltages to synthesize a 240 Vac rms sinusoidal reference. In this regard, this illustrates the addition of each of the DC "steps" to form an AC signal. As previously mentioned, a first solar panel outputs a first voltage having the longest square-wave width, a second solar panel outputs a second voltage having a square-wave width that is less than the width of the first solar panel square-wave output, a third solar panel outputs a third voltage having a quasi square-wave width that is less than the width of the second solar panel square-wave output, a fourth solar panel outputs a fourth voltage having a square-wave width that is less than the width of the second solar panel square-wave output, and so on for each solar panel. This process occurs in real-time and is continually monitored to determine the output voltages of each of the solar panels which determines the rankings of which quasi square-waves have the longest or widest output relative to each other. Then, these quasi square-waves are added together and since each square wave has a successively shorter length or width, the resulting output is shown as FIGS. 6A-6C where an AC waveform is created from the quasi square-waves.

FIG. 6A shows the multilevel AC output waveform when all DC bus voltages are identical and are equal to 35 Vdc, thus mimicking uniform irradiance conditions. For each DC bus voltage, the system staggers the DC bus voltages to create the AC waveform. It may be noticed that although twelve panels are available, only ten are being employed to generate the required 240 Vac, thus forming a 21-level staircase waveform.

FIG. 6B shows when some panels exhibit voltages between 28-30 Vdc. In this case eleven panels are being used to generate a 23-level waveform. Finally, FIG. 6C illustrates a case when the panels are subject to severe non-uniform irradiance and dirt conditions. In this scenario the controller employs all twelve panels to construct a complete twenty-five level waveform synthesizing 240 Vac rms voltage at the output. Furthermore, in FIGS. 6B and 6C, it may be noticed that panels capable of synthesizing larger DC voltages are sorted and kept at the base of the waveform thereby extracting more power. Conversely, panels that have smaller DC voltages are sequenced to be at the top thus contributing only a smaller amount of real power.

Solar Panel Model

Figure 7:
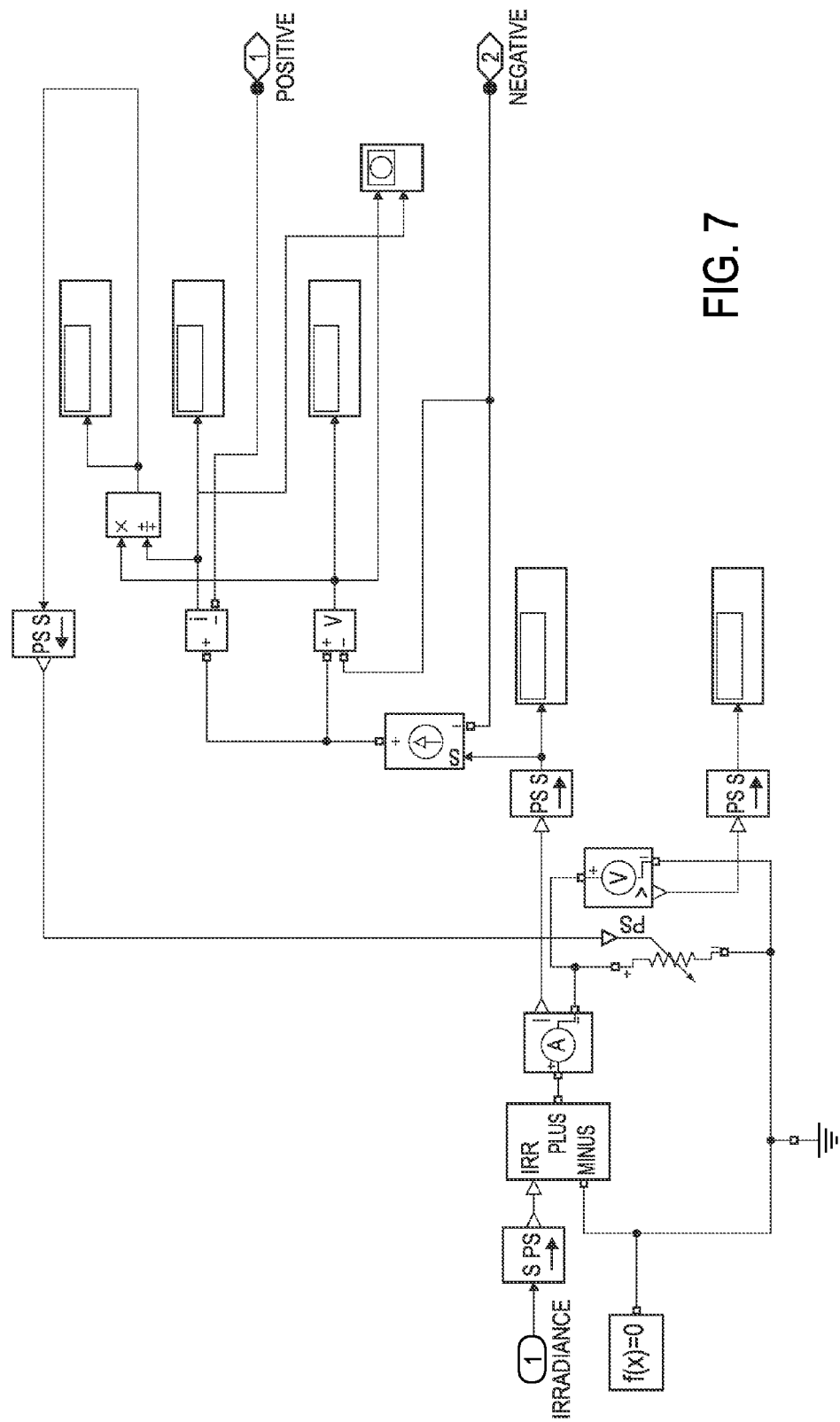
FIG. 7 illustrates an example of a schematic of a photovoltaic panel that is capable of interfacing with power electronic converters according to various embodiments of the present invention.

As explained in the previous section, basic feasibility of sorting and sequencing control concept for the solar panel companion inverter system was verified as a first step using ideal isolated variable DC sources. As the next step, in further demonstrating the efficacy of this approach was to model a real solar panel in Matlab Simulink. There are several methods reported in literature to model a photovoltaic panel. However, these approaches focus on using physical attributes such as reverse saturation current in a p-n junction and employ blocks in SimElectronics to model a solar cell in Matlab Simulink. A schematic of photovoltaic panel simulation block constructed for this purpose is shown in FIG. 7.

Figure 8:
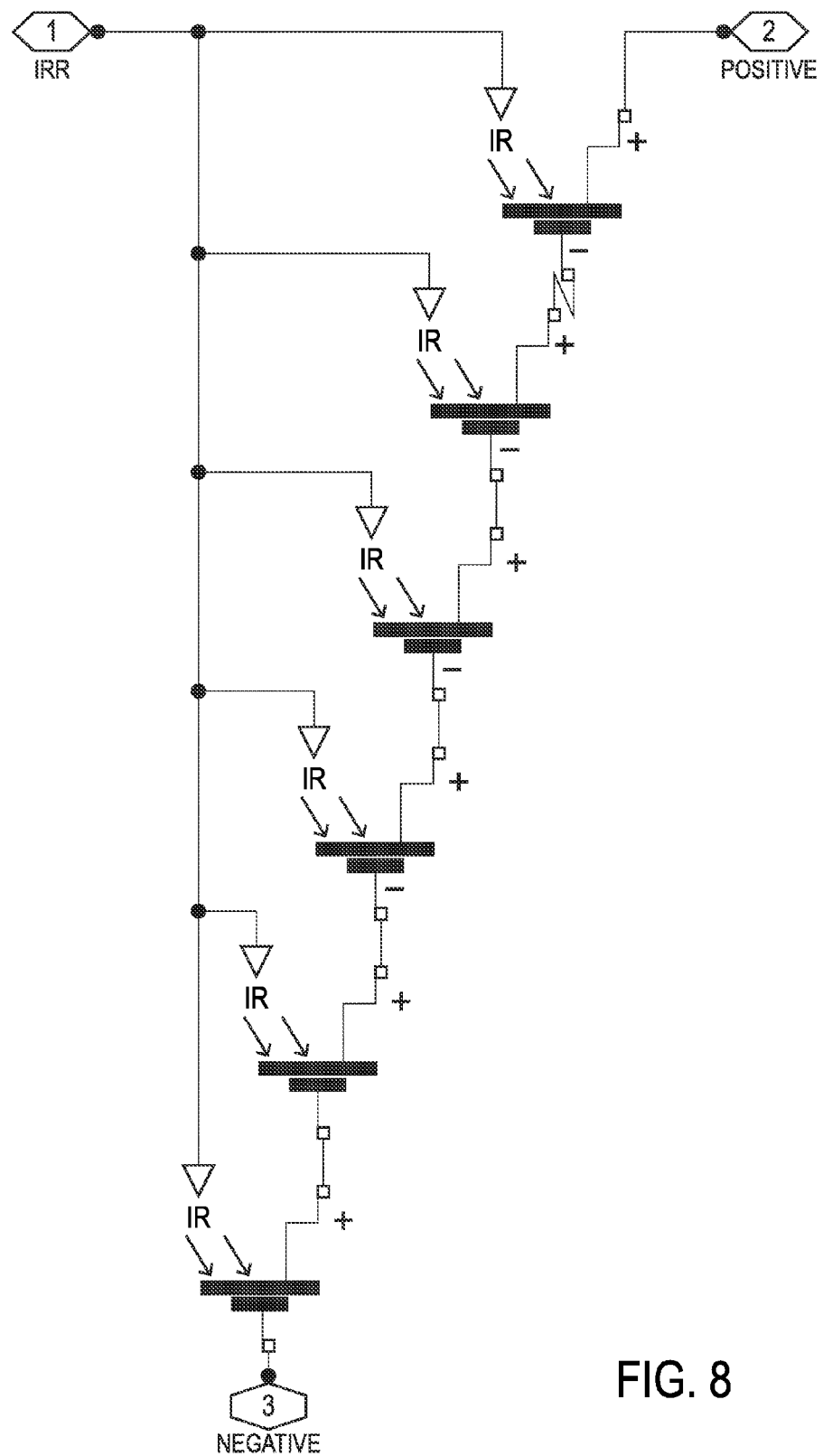
FIG. 8 represents an example of fundamental building block of the model of a photovoltaic panel according to various embodiments of the present invention.

The solar cell module shown in FIG. 8 is available in SimElectronics or any other similar solar cell module may be used as a fundamental building block to construct the model of a panel in Matlab Simulink. Each cell is configured for open circuit voltage of 0.6V and short circuit current of 7.34 A at an irradiance of 1000 W/m2. Seventy-two such cells are connected in series to form a panel that gives currents and voltages in physical domain.

Figure 9:
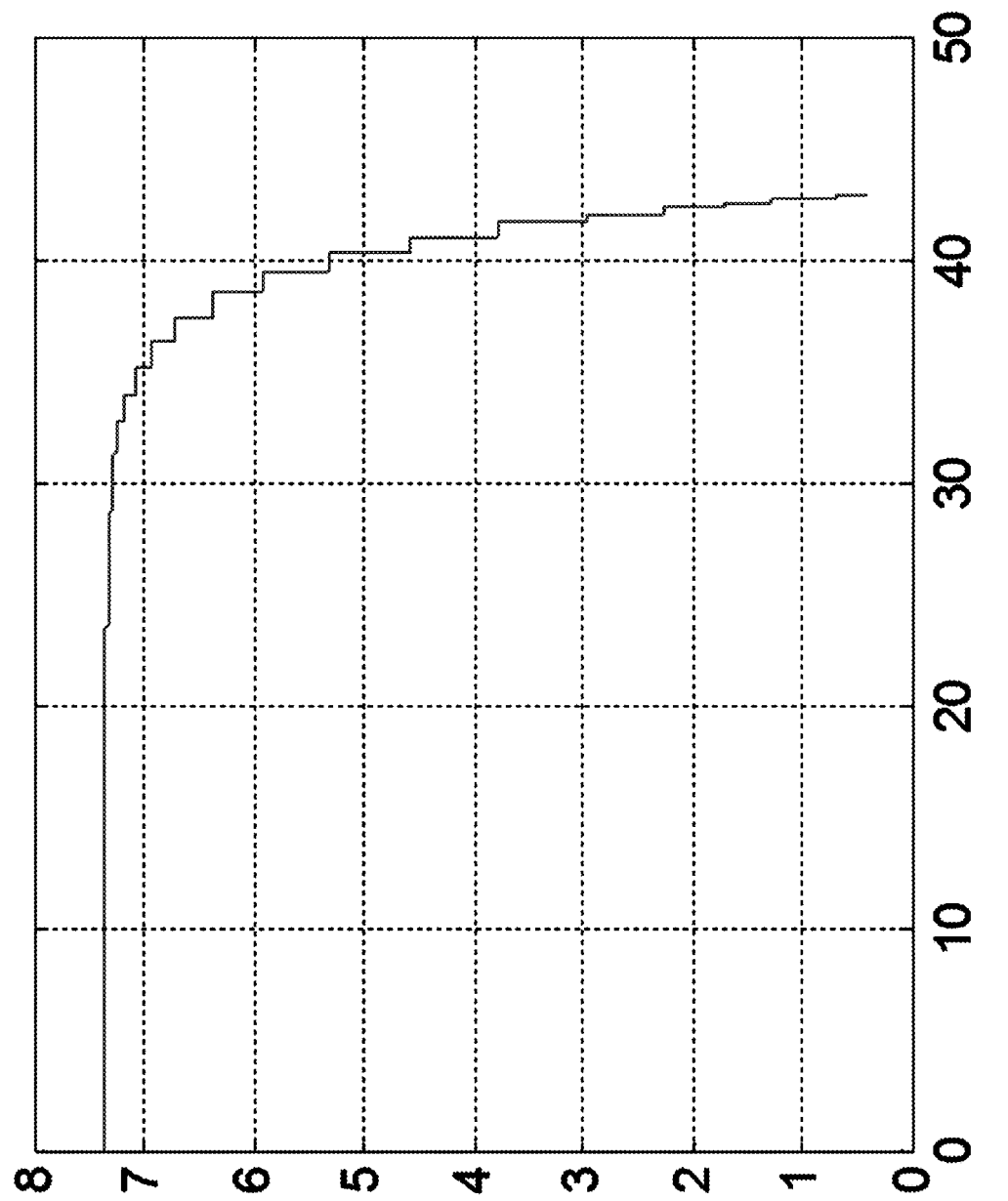
FIG. 9 illustrates exemplary I-V characteristics obtained with the solar panel model according to various embodiments of the present invention.
Figure 10:
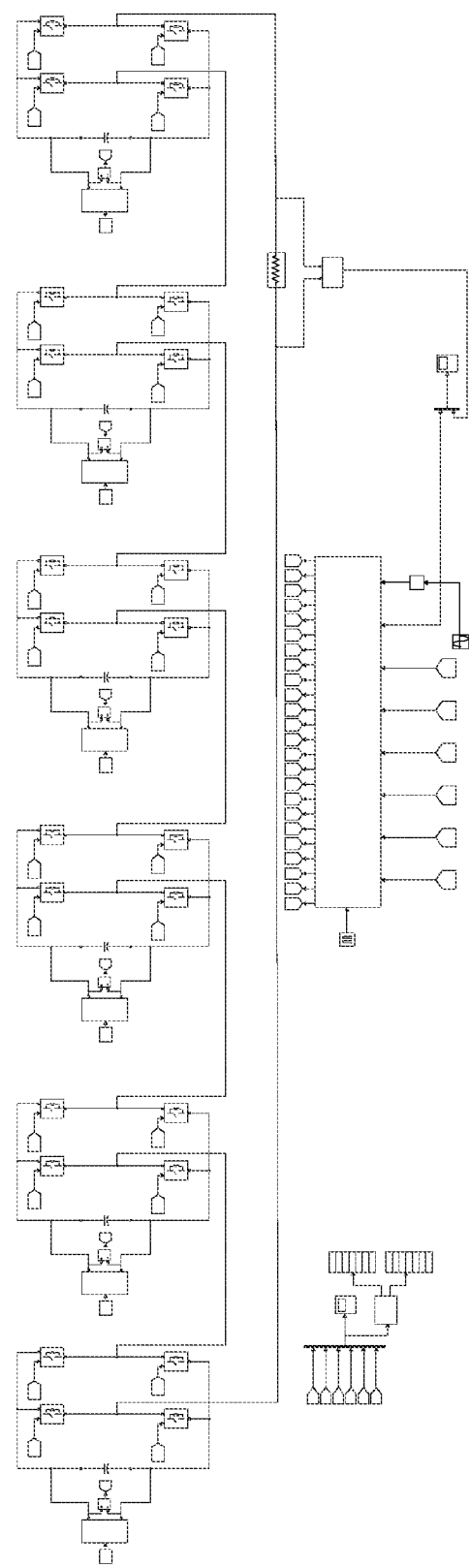
FIG. 10 shows a simplified schematic of a model of a sample six H-bridge half-scale representation of a SPCI system supplied by photovoltaic panel models according to various embodiments of the present invention.

As shown in FIG. 10, this panel is connected to a variable resistance in physical domain, and associated current flowing through it is measured. This measured current is converted to SimPowerSystems and is used to operate a controlled current source in the power domain. The voltage across this current source is measured and impedance is calculated, which is then fed back to the variable resistance in the physical domain. Thus a realistic photovoltaic panel model is created to verify feasibility of the solar panel companion inverter. Finally, performance of the model is confirmed by plotting V-I characteristics and comparing it with real panel parameters as shown in FIG. 9.

To confirm the working of PV models with solar panel companion inverter approach, a representative 13-level solar panel companion inverter system supplied by six photovoltaic panels is simulated using Matlab-Simulink. FIG. 10 shows a schematic of this model. As may be seen, each H-bridge inverter is supplied by the newly created PV model, and all six inverters are connected together in series. The inputs to the controller are six DC bus voltages and one reference AC output voltage, which executes sorting and sequencing logic. The outputs are twenty-four gate signals that are given to individual power devices.

Figure 11A:
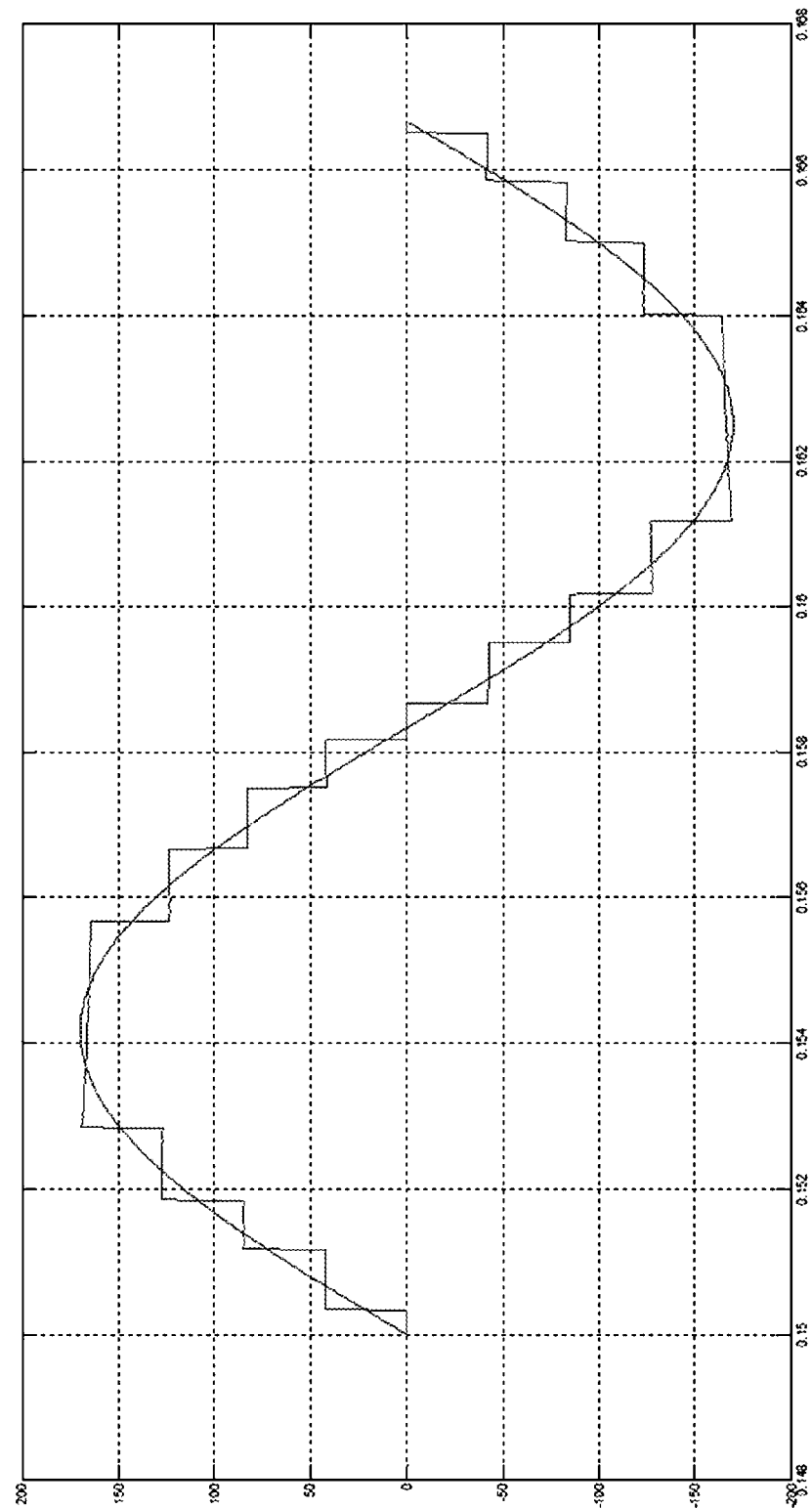
FIG. 11A depicts output voltage of a SPCI system under uniform irradiance conditions where all DC output voltages are equal according to various embodiments of the present invention.
Figure 12A:
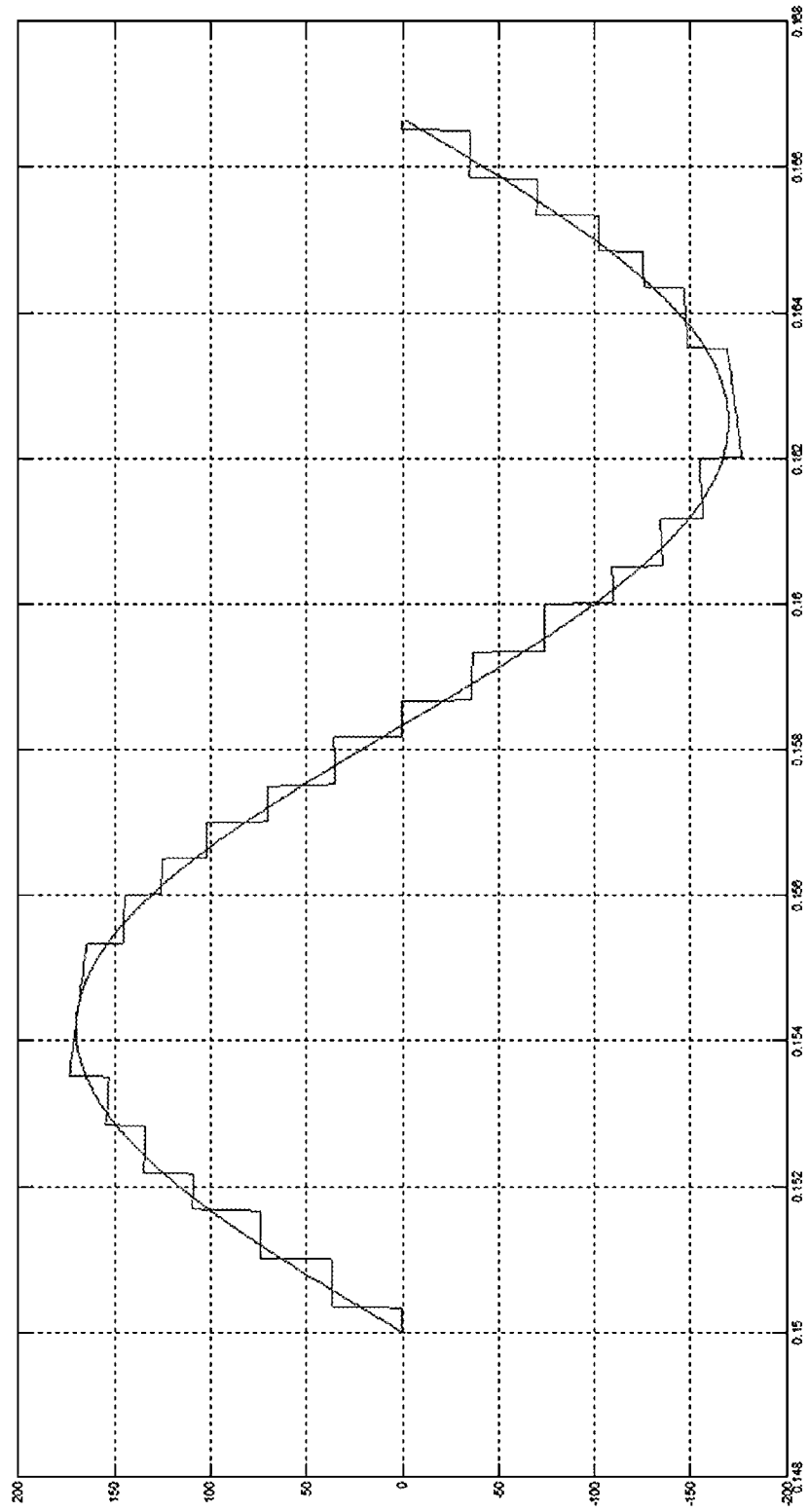
FIG. 12A represents an example of output voltage of a SPCI system under non-uniform irradiance and dirt conditions where all panels contribute to form 13-level AC waveform to synthesize 120 Vac rms according to various embodiments of the present invention.
Figure 12B:
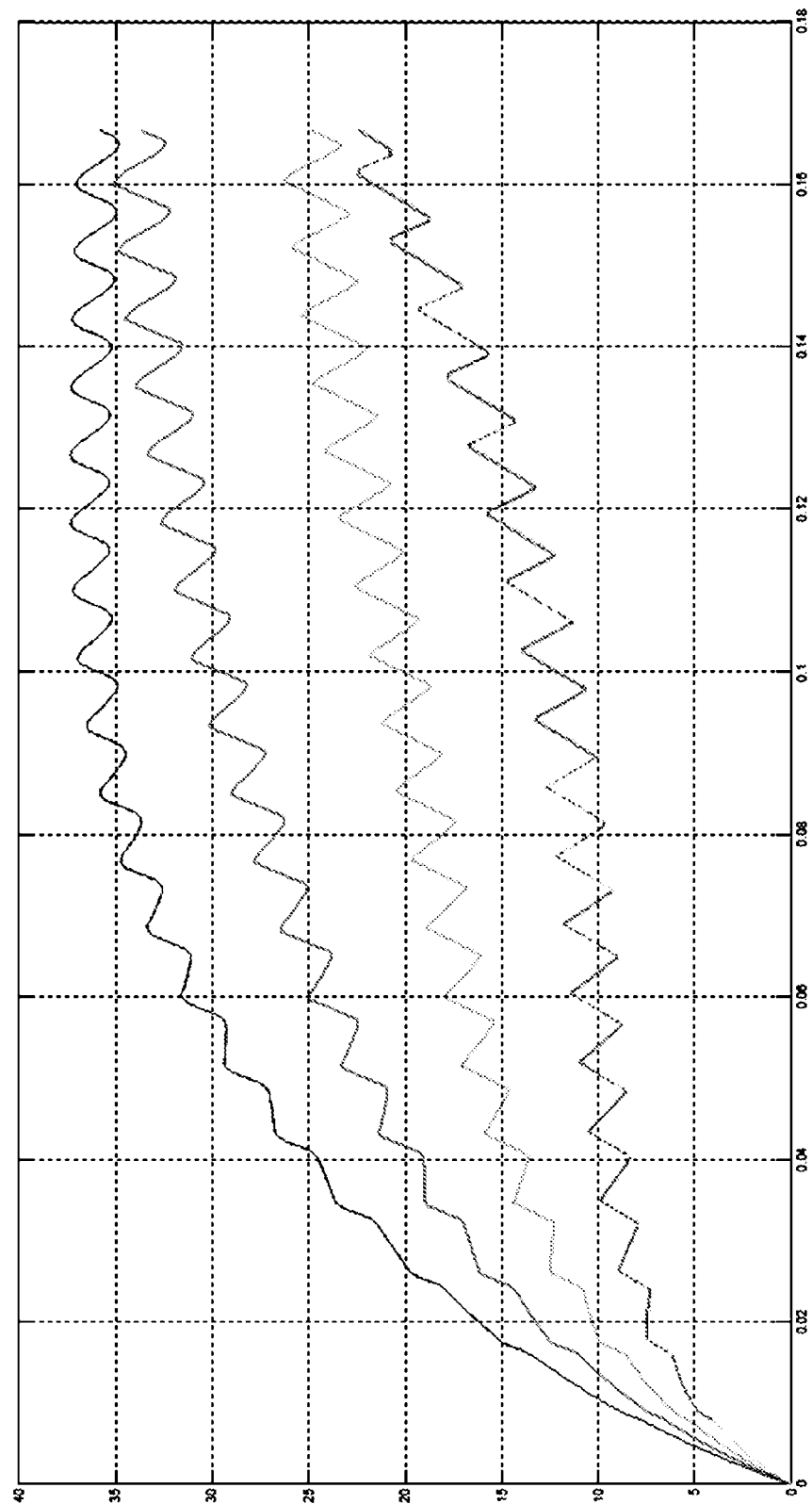
FIG. 12B illustrates an example of photovoltaic panel voltages under non-uniform irradiance and dirt conditions where the panel voltage with the least irradiance is loaded lightly according to various embodiments of the present invention.

Sample staircase waveforms generated with varying irradiance levels to synthesize a 120 Vac rms sinusoidal reference are shown in FIGS. 11A and 12A. FIG. 11A shows the multilevel output waveform when all irradiance levels are identical thus mimicking uniform irradiance conditions. It may be noticed that although six panels are available, only four are being employed to generate the required 120 Vac rms, thus forming a 9-level staircase waveform. FIG. 12A illustrates a case when the panels are subject to non-uniform irradiance and dirt conditions. In this scenario the controller employs all six panels to construct a complete thirteen level waveform synthesizing 120 Vac rms voltage at the output. It may be noted that the panels are sorted and sequenced continuously thus loading them uniformly under all scenarios. Furthermore, from FIG. 12B, it may be noticed that panels capable of synthesizing larger DC voltages are sorted and kept at the base of the waveform thereby extracting more power. Conversely, panels that have smaller DC voltages are sequenced to be at the top thus contributing only a smaller amount of real power as was done in the previous simulation cases.

Grid Synchronization

Figure 16:
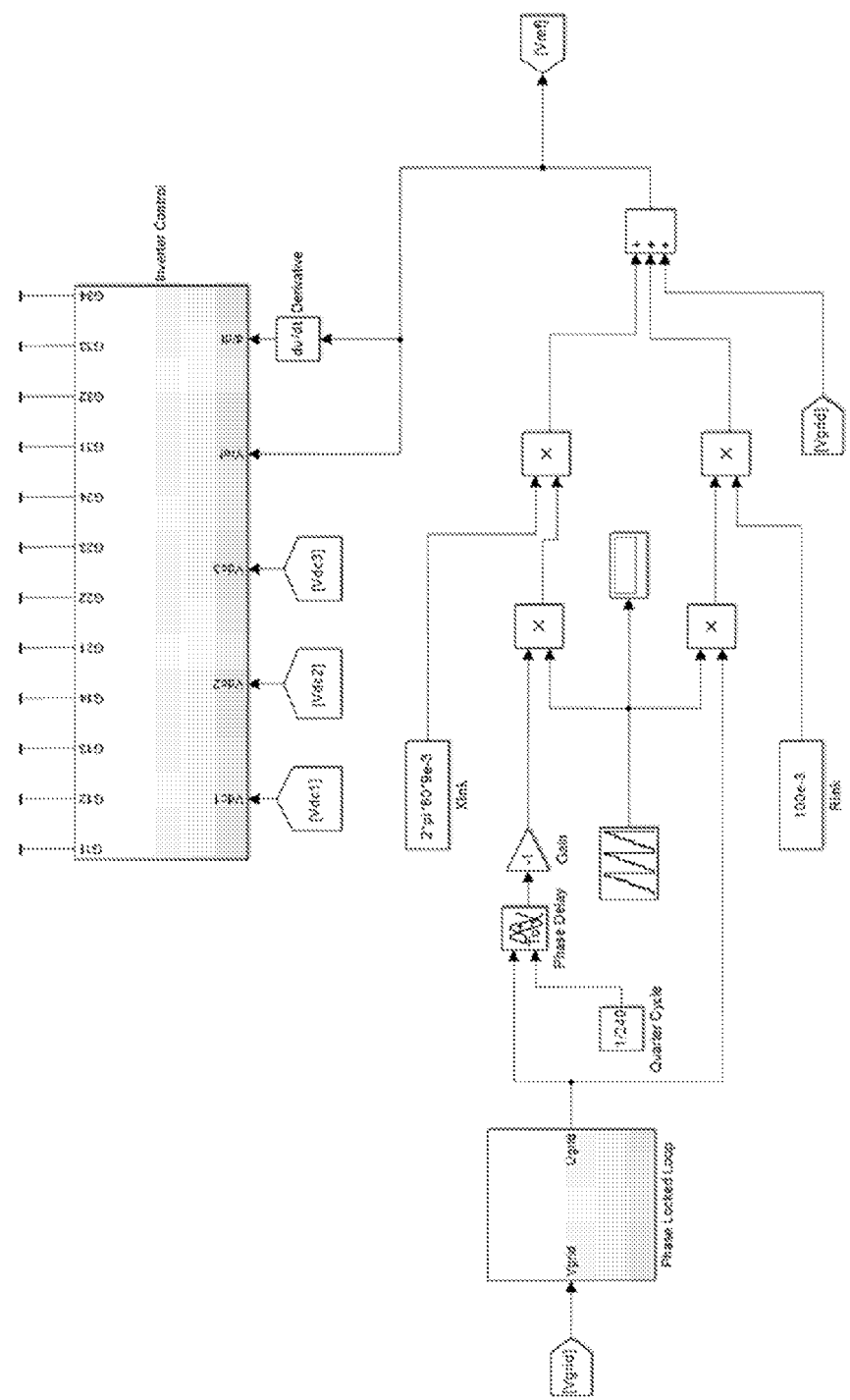
FIG. 16 shows an example of a simplified schematic that generates reference voltage for a SPCI system according to various embodiments of the present invention.

As explained in the earlier section, a representative half-scale model of the solar panel companion inverter system composed of multiple quasi-square wave synthesizing H-bridges, each supplied from a photovoltaic source was successfully created, simulated and analyzed. Towards further ascertaining the promise of this solar panel companion inverter approach, next step was to replace passive resistive-inductive loads with real utility grid interface, and ensure that the solar panel companion inverter system can be synchronized with the grid. FIG. 16 shows a control module constructed to synchronize the output current of the solar panel companion inverter system with the phase of grid voltage.

Figure 13:
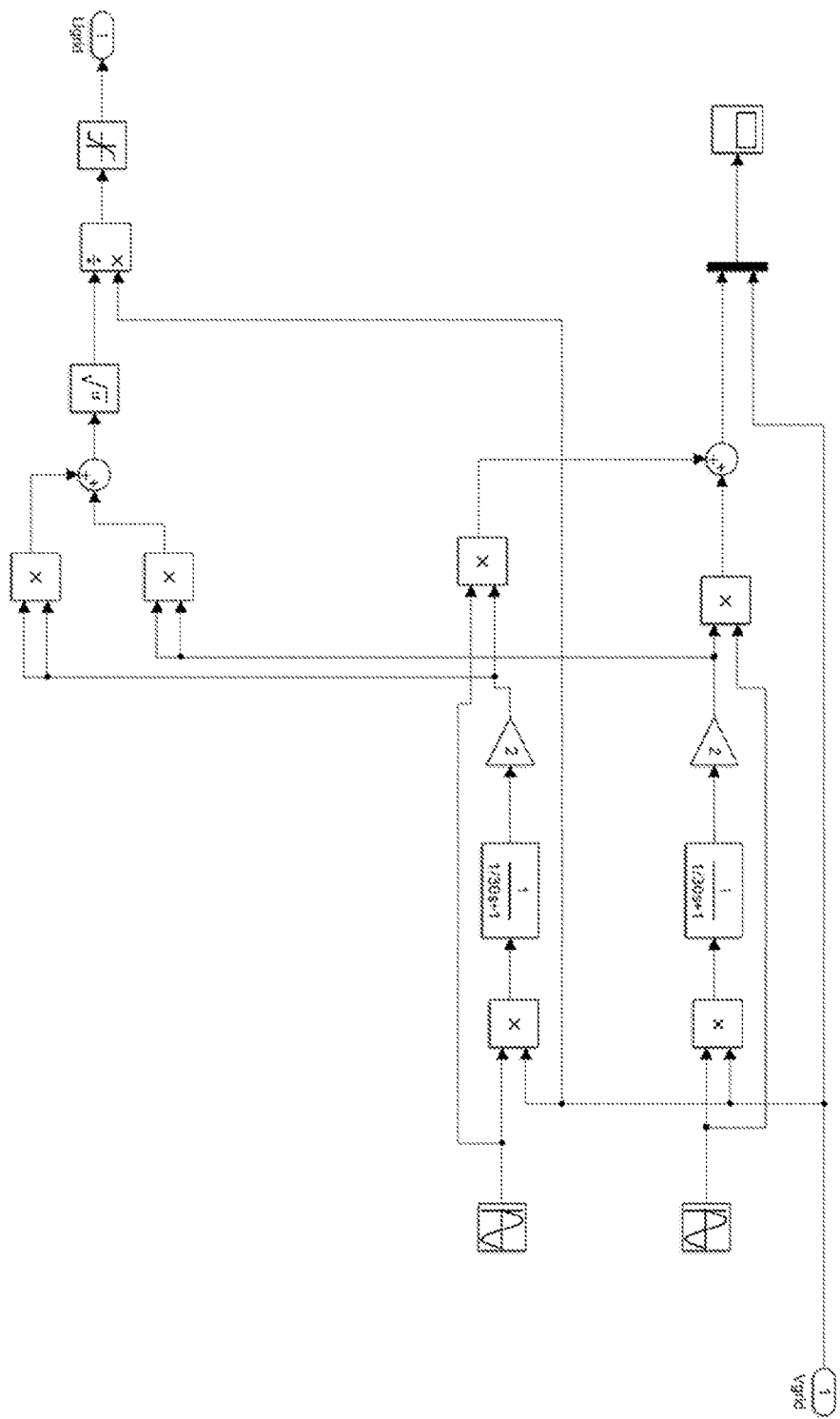
FIG. 13 shows an example of a simplified schematic of a phase locked loop employed to synchronize the current in solar panel companion inverter system with the grid voltage according to various embodiments of the present invention.
Figure 14A:
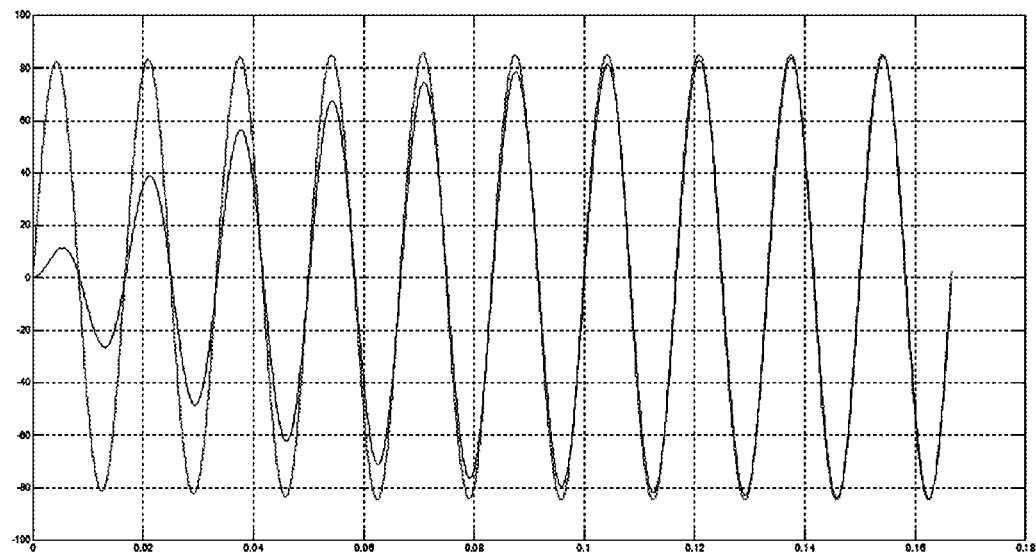
FIG. 14A depicts an example of a grid voltage and its synchronized image reconstructed in the controller according to various embodiments of the present invention.
Figure 14B:
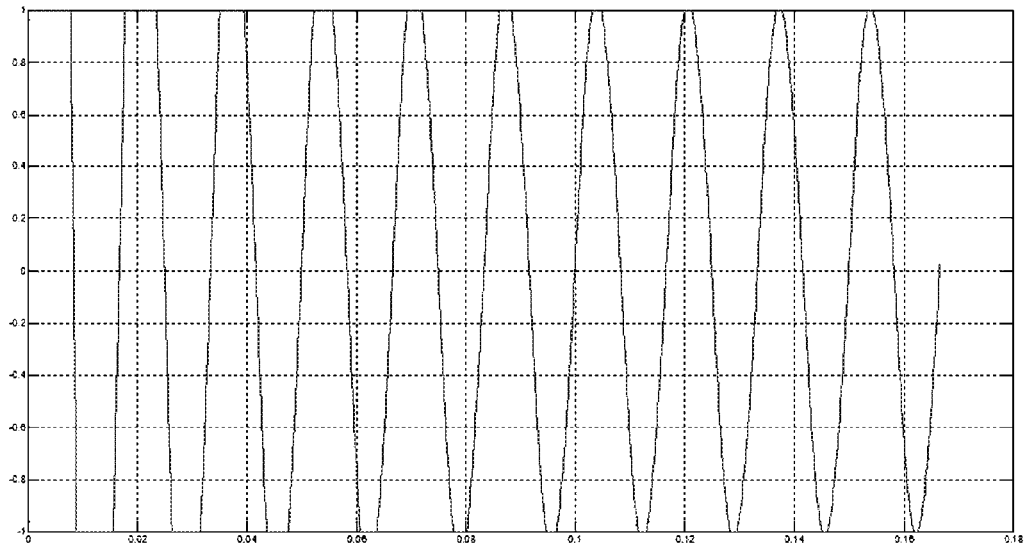
FIG. 14B illustrates an example of unity amplitude waveform synchronized with the grid voltage according to various embodiments of the present invention.

As may be seen from FIG. 13, the AC grid voltage is measured and is multiplied with an arbitrary orthogonal set of waveforms, in this case unit amplitude sine and cosine waveforms. The components that are not in phase with the sine and cosine waves average out to null and can be easily separated. However, the components in phase form square terms which have DC values of half the amplitude. Hence these DC values are extracted and multiplied by 2 to give the projections of the fundamental component on the orthogonal axes. These projections when multiplied to the original set of orthogonal waveforms and added together give the fundamental component of the grid voltage. This is illustrated in FIGS. 14A and 14B.

Figure 15A:
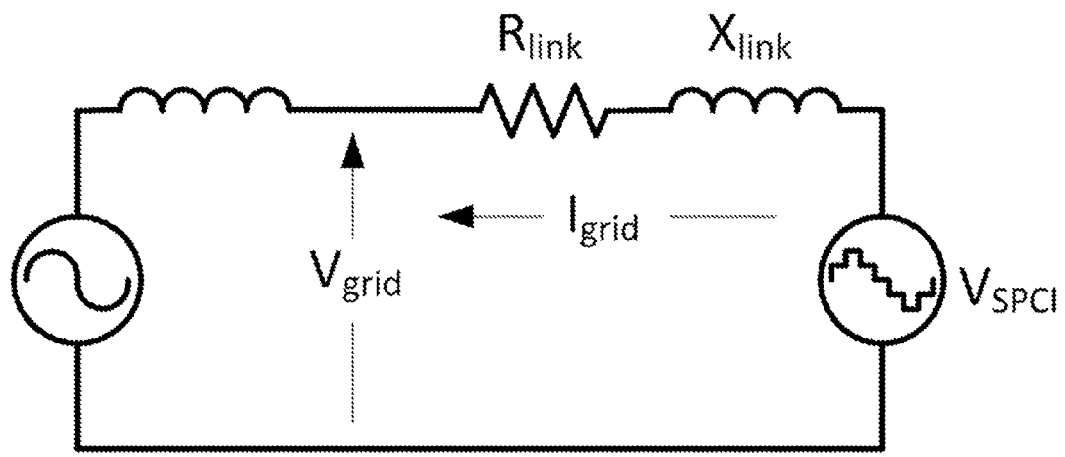
FIG. 15A represents an example of a one-line diagram of a grid-connected SPCI system according to various embodiments of the present invention.
Figure 15B:
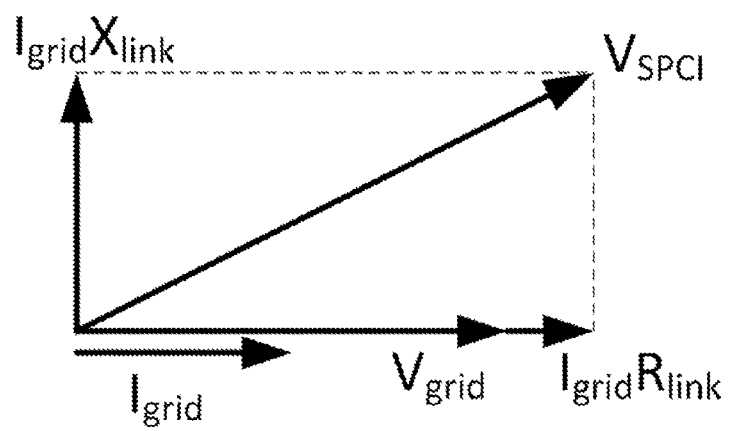
FIG. 15B illustrates an example of a phasor diagram of a grid-connected SPCI system according to various embodiments of the present invention.

FIG. 15A shows a one line diagram of the solar panel companion inverter system along with its phasor diagram shown in FIG. 15B. As may be seen, the current delivered to the grid by the solar panel companion inverter is in phase with the grid voltage. The magnitude of this current Igrid is determined by the maximum power point tracking controller that ensures that maximum available power is extracted from the solar panels at any given time. Once the magnitude is set, it is straightforward to compute the required voltage to be delivered by the solar panel companion inverter. This voltage reference VSPCI is a vector sum of the grid voltage, voltage drop across the link resistance, and voltage drop across the link reactance. FIG. 16 shows implementation of this logic in the simulation model.

As may be seen from FIG. 16, the unity amplitude waveform that is synchronized with the grid voltage is multiplied by the current demand and by the link resistance estimate. The unity amplitude waveform is also delayed by a quarter cycle to synchronize with the voltage across the link reactance. This when multiplied by the estimate of link reactance and current demand gives the quadrature component of the reference voltage. The grid voltage is added to the link voltage drop to generate the reference for the solar panel companion inverter and given to the controller input.

To verify the functionality of the solar panel companion inverter method, a model of a representative sample system consisting of three H-bridge inverter modules interfaced with a 60 Vac rms grid is constructed in Matlab-Simulink.

Figure 17:
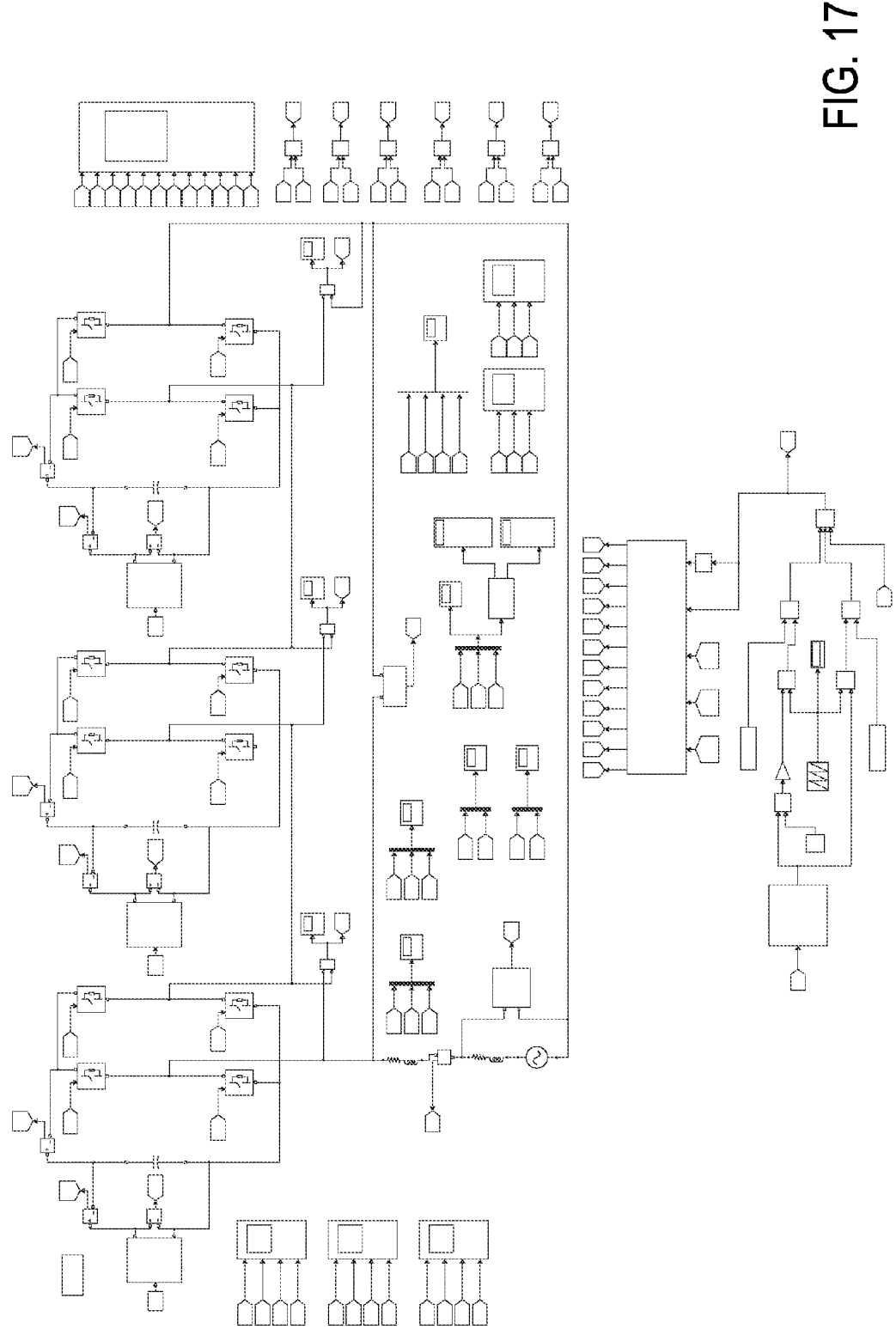
FIG. 17 depicts an example of a simplified schematic of a grid connected to three H-bridge quarter-scale representation of a SPCI system according to various embodiments of the present invention.
Figure 18:
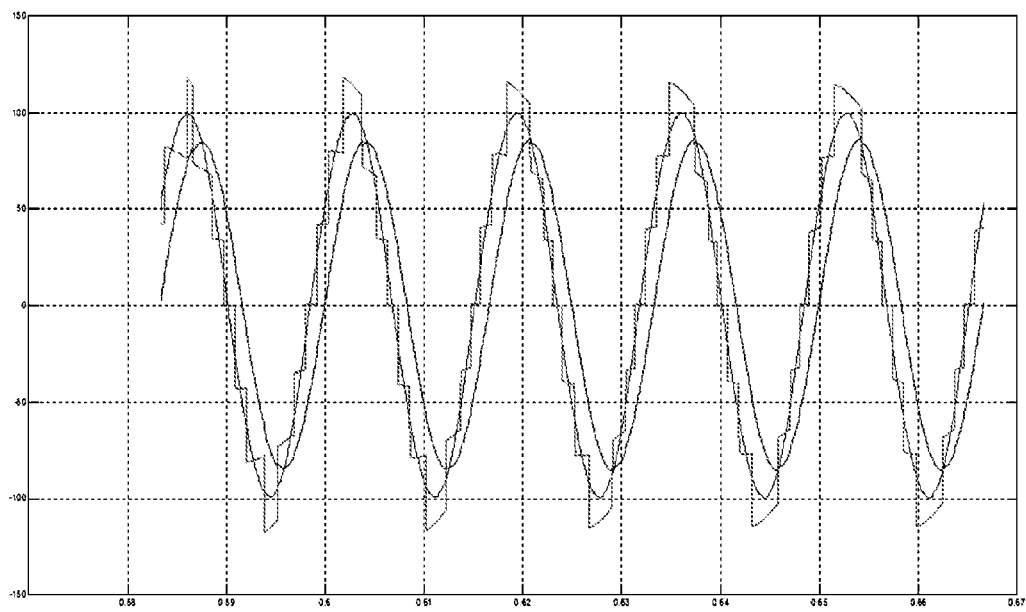
FIG. 18 illustrates a graph of a grid voltage, reference voltage to the inverter, and actual inverter voltage obtained with proposed SPCI system according to various embodiments of the present invention.
Figure 19A:
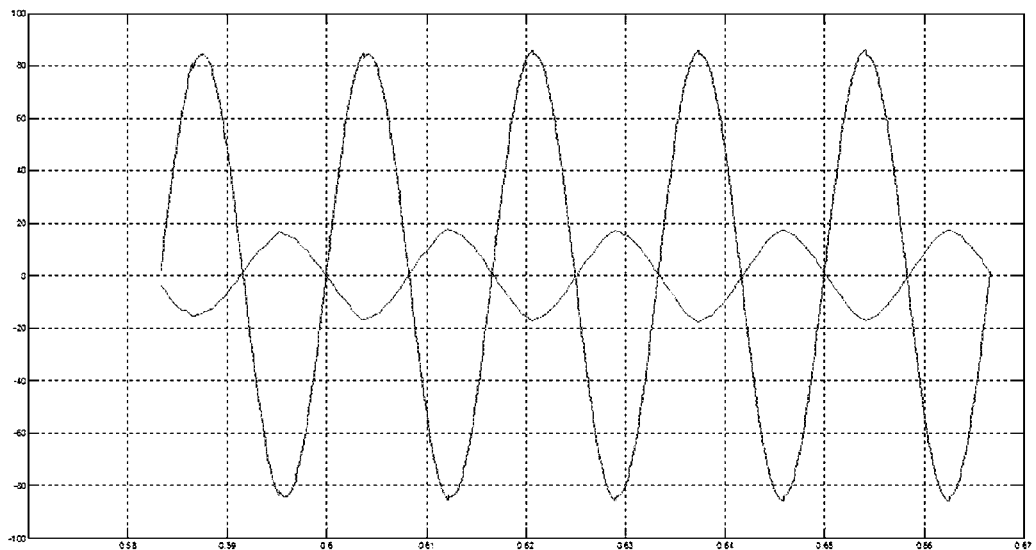
FIG. 19A represents an example of a graph of a grid voltage and grid current obtained with a SPCI system where current is in phase and in opposite polarity with respect to voltage according to various embodiments of the present invention.
Figure 19B:
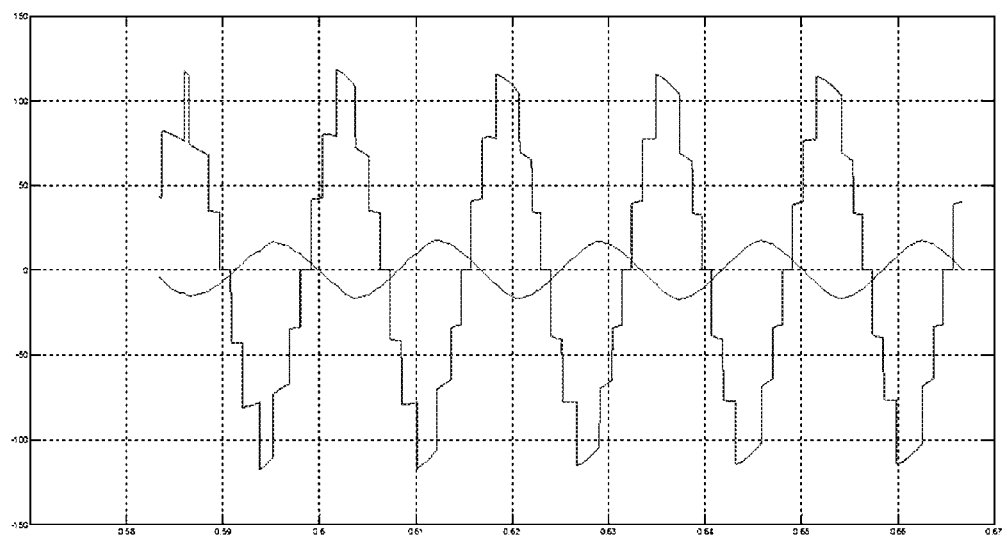
FIG. 19B illustrates an example of a graph of a seven-level inverter voltage and grid current obtained with proposed SPCI system according to various embodiments of the present invention.

FIG. 17 shows a schematic of this model. As may be seen, each H-bridge inverter is supplied by the PV model, and sum of all three inverters is interfaced with the grid. The inputs to the controller are three DC bus voltages and one reference AC output voltage, which executes sorting and sequencing logic. The outputs are twelve gate signals that are given to individual power switches.

A quarter-scale model (three H-bridge, 7-level inverter interfaced with 60 Vac rms source representing twelve H-bridge, 25-level inverter interfaced with 240 Vac rms grid) shown in FIG. 17 had been extensively tested and analyzed to verify feasibility of the solar panel companion inverter system. Selected summary waveforms are shown in FIGS. 18, 19A, 19B, 20A, and 20B.

Figure 20A:
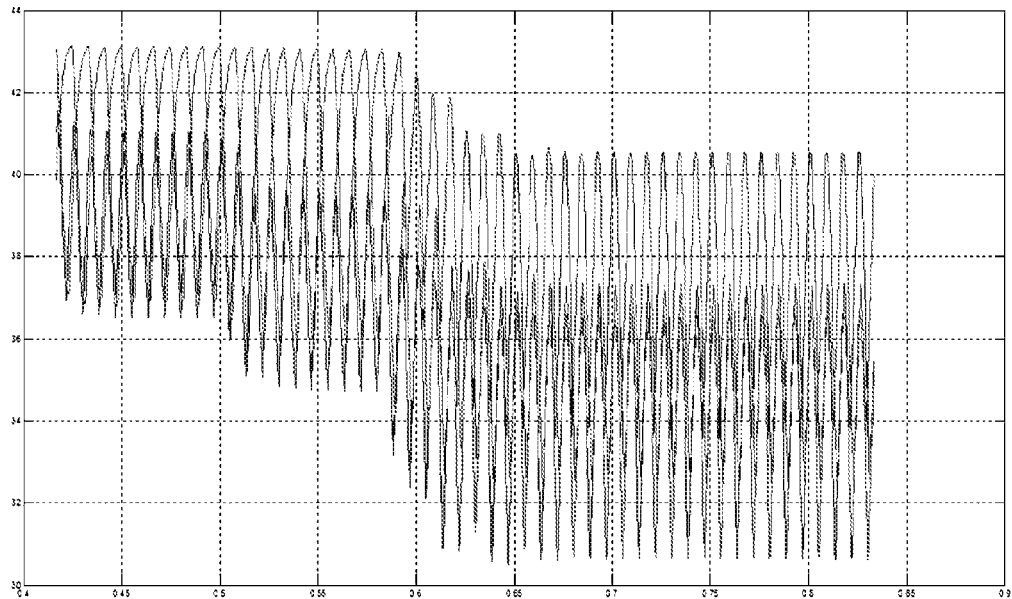
FIG. 20A shows an example of a graph of individual photovoltaic panel voltages showing tracking towards Vmpp (e.g., ~35 Vdc) according to various embodiments of the present invention.
Figure 20B:
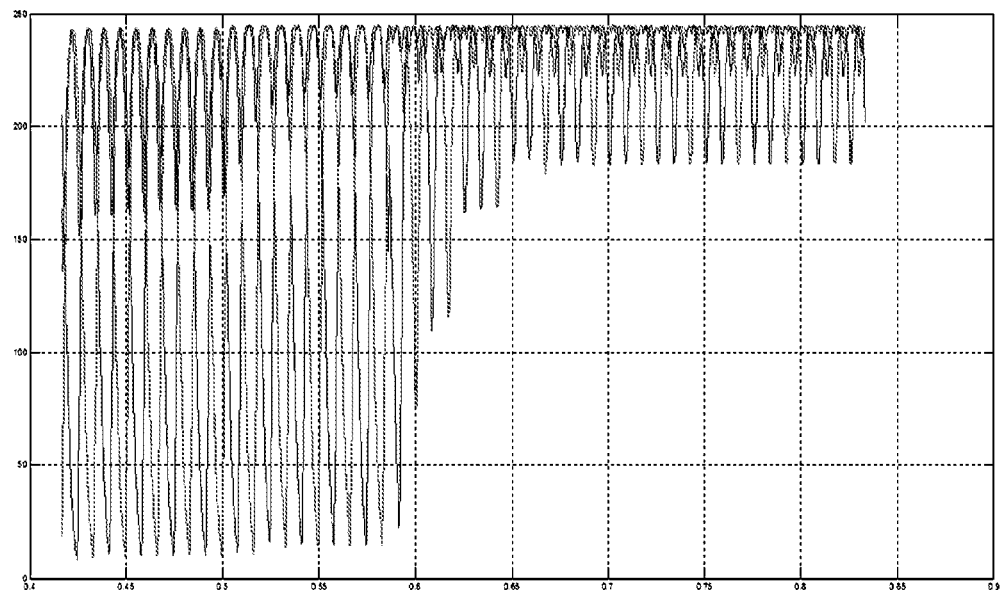
FIG. 20B depicts an example of a photovoltaic panel power showing panel-level maximization of energy yield according to various embodiments of the present invention.

It has been shown in FIG. 20A and FIG. 20B that it is possible to operate individual inverters in the solar panel companion inverter system at their maximum power points by sorting and sequencing algorithms. However, it is also preferable to have an outer control loop based on aggregate power delivered by the entire system. In this regard, reference current may be generated by an algorithm that is based on aggregate maximum power point tracking As may be seen from FIG. 17, reference current is being generated by the operator in the Matlab-Simulink model. Delivered power may be calculated by multiplying panel voltages with associated currents and tune the requested overall current such that aggregate power is also at its maximum power point.

Reactive Power Compensation

As may be seen from FIGS. 15A and 15B, the reference current in the simulation model is determined on the basis of only the real power transferred from the solar panel companion inverter to the grid. A component of reactive power may be included in the reference which would provide the required Volt/VAr support to the power grid in addition to transferring real power from the photovoltaic panels.

Method Operation

Figure 27:
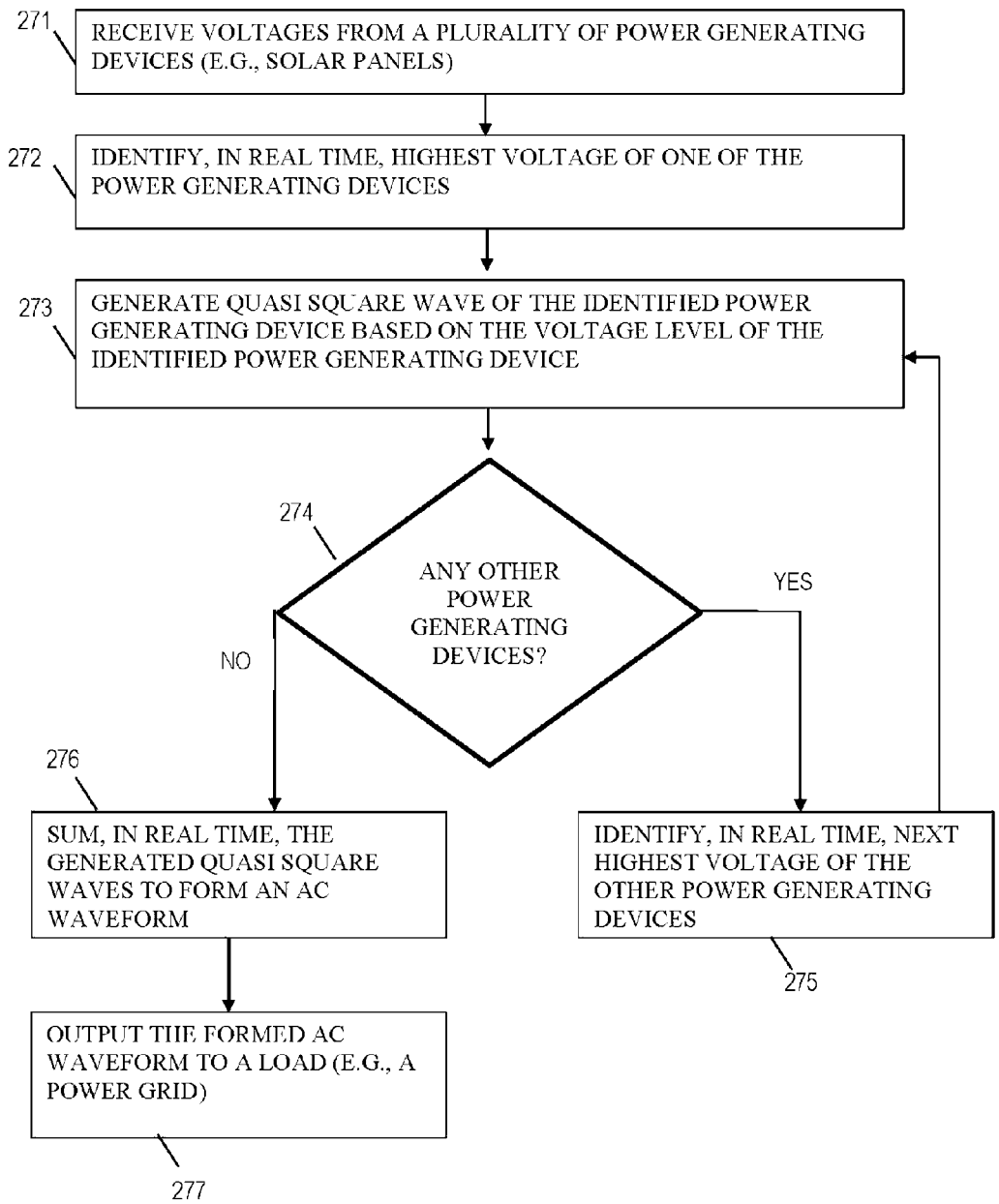
FIG. 27 illustrates a flow diagram of operating a control system for an electrical energy output device to convert generated power to an AC waveform useable by a device or a power grid, according to an embodiment.

FIG. 27 illustrates a method of operating a control system for an electrical energy output device to convert generated power to an AC waveform useable by a device or a power grid, according to an embodiment.

In block 271, the device system receives voltages from each of a plurality of power devices, such as a plurality of solar panels (where sun energy is converted to such voltages). These voltages may be a form of a half-sine wave similar to that shown in FIG. 24.

In block 272, from all of the voltages received, the controller of the system identifies or determines, in real time, the highest voltage of the power devices.

In block 273, a first quasi square wave is generated from such identified highest output voltage. The length or width of the first quasi square wave is based on the voltage level of such identified highest power device. For example, the length of the first quasi square wave is the highest among all generated quasi square waves.

The system then generates quasi square waves for the other power devices' outputs. To do this, in block 274, the system may determine if there are other power devices outputting voltages where a quasi square wave has not been generated. If so, in block 275, the next highest voltage of the remaining power devices (at a single point in time) is identified by the system and the method may continue back to block 273 where a quasi square wave is generated for such next-highest voltage of the next power device.

For example, for a second power device that is generating a second-highest voltage (as compared with all of the power devices at substantially the same time as the first power device is generating the highest output voltage), the system generates a second quasi square wave that has a length that is less than the first quasi square wave and thus, the second quasi square wave is generated based on having the second highest voltage.

This process (i.e., blocks 273-275) is completed for each of the remaining power devices substantially at the same time as the first and second quasi square waves are generated so that this process occurs continuously in real time. For example, a third quasi square wave is generated based on having the third highest output voltage at the time that the first and second power devices output the highest and second-highest voltages. The third quasi square wave has a length or width that is less than both the first and second quasi square waves. This process occurs until the lowest voltage that is identified results in a generated quasi square wave that has a length that has the shortest length or width of the other generated quasi square waves. In one embodiment, all quasi square waves have staggered lengths or widths so that when superimposed with each other, a substantially-equivalent AC waveform is generated. When all power devices (at a single point in time) have had quasi square waves generated (at the single point in time), then the method continues from block 274 to block 276. As mentioned above, this process (i.e., blocks 273-275) is completed continuously in real time at a plurality of points in time.

Blocks 273-275 are effectively illustrated in FIGS. 24 and 26 and block 276 is illustrates in FIGS. 23 and 25, respectively.

In block 276, at a single point in time (and continuously in real time), the generated quasi square waves at a single cycle (i.e., at a single point in time) are summed so that they are all superimposed onto each other to form an AC signal similar to those shown in FIGS. 23 and 25.

In block 277, the AC waveform output may then be applied to a load, such as a power grid.

It is noted that the term "quasi-square wave" is used throughout but it should be noted that any waveform can be employed and the present invention should not be limited to a power conversion circuit that generates a quasi-square wave. In other words, the present application can employ a power conversion circuit (e.g., an H-bridge inverter, other inverters, other devices which convert a DC signal to a square-wave-like signal) to convert the output voltage of the power device to a waveform (e.g., a quasi-square wave, a switched quasi square wave, etc.). Such waveform is effectively "extracted" from the output voltage of the power device such that the power of a single cycle (e.g., the width of the waveform varies as shown in FIG. 24) is extracted from the output voltage.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method comprising:
receiving voltages from a plurality of power devices connected to a controller;
identifying, by the controller in real time, relative levels of voltages output from each of the plurality of power devices;
generating, in real time, a waveform for each respective voltage of the power devices so that, for each cycle, power extracted from each generated waveform over a single waveform cycle is based on the relative levels of voltages from each respective power device and so that the extracted power, for each cycle, from each waveform is higher than the extracted power of the other generated waveforms that have lower voltages; and summing, in real time, the generated waveforms to form an AC waveform.

2. The method of claim 1, wherein the generating a waveform for each respective voltages of the power devices comprises:
identifying a first voltage of a first power device being the highest voltage of all voltages of the power devices;
generating a first waveform based on the first voltage; and
generating second and subsequent waveforms, each having a power level of a single cycle to be less than or equal to a power level of a single cycle of the first waveform.

3. The method of claim 1, wherein the generated waveforms comprise at least one of switched quasi-square waves and triangle waves.

4. The method of claim 1, further comprising transmitting the AC waveform to a load.

5. The method of claim 4, wherein the load comprises a power grid.

6. The method of claim 1, wherein the power devices each comprises one of: a plurality of solar panels, a plurality of energy storage devices, or a plurality of wind turbines.

7. The method of claim 1, wherein the generated waveforms comprise at least one of switched quasi-square waves, and wherein the generated switched quasi square waves of all of the power devices are generated at substantially the same single point in time on a continual basis so that the waveforms are generated in real time.

8. The method of claim 1, wherein the extracted power over a single cycle comprises a summation of power of the generated waveform over the complete single cycle.

9. A system comprising:
a plurality of power devices;
a power conversion circuit connected to the respective outputs of the plurality of power devices; and
a controller connected to the plurality of power devices to control the output of the power conversion circuit;
wherein the controller identifies, in real time, levels of voltages output from each power device;
wherein the system generates, in real time, a waveform for each respective voltages of the power devices, wherein, for each cycle, power extracted from each waveform over a single cycle is based the relative levels of voltages from each respective power device so that the power level, for each cycle, from each waveform is higher than the currents of the other generated waveforms that have lower voltages; and
wherein the system sums, in real time, the generated waveforms to form an AC waveform.

10. The system of claim 9, wherein the system generating a switched quasi square wave for each respective voltages of the power devices comprises:
identifying a first voltage of a first power device being the highest voltage of all voltages of the power devices;
generating a first quasi square wave based on the first voltage;
identifying a second voltage of a second power device being lower than the first voltage but higher than all voltages of the power devices other than the first power devices; and
generating a second quasi square wave having a length less than the first square wave but greater than all other quasi square waves.

11. The system of claim 10, wherein the generating a switched quasi square wave for each respective voltages of the power devices further comprises:
identifying a third voltage of a third power device being lower than the second voltage but higher than all voltages of the power devices other than the first and second power devices; and
generating a third quasi square wave having a length less than the first and second square waves but greater than all other quasi square waves.

12. The system of claim 9, wherein the system applies a triangle waveform to the generated quasi square waves prior to the summing.

13. The system of claim 9, further comprising an output device that transmits the AC waveform to a load.

14. The system of claim 13, wherein the load comprises a power grid.

15. The system of claim 9, wherein the power devices comprises a plurality of solar panels.

16. The system of claim 9, wherein the power conversion circuit comprises an H-bridge inverter.

17. A non-transitory computer readable medium that includes instructions that, when executed by a processor, executes a method comprising:
receiving voltages from a plurality of power devices connected to a controller;
identifying, by the controller in real time, relative levels of voltages output from each power device;
generating, in real time, a waveform for each respective voltage of the power devices so that, for each cycle, power extracted from each generated waveform over a single waveform cycle is based on the relative levels of voltages from each respective power device and so that the extracted power, for each cycle, from each waveform is higher than extracted power of the other generated waveforms that have lower voltages; and
summing, in real time, the generated waveforms to form an AC waveform.

18. The non-transitory computer readable medium of claim 17, wherein the generated waveforms comprise switched quasi square waves.

19. The non-transitory computer readable medium of claim 17, wherein the generated waveforms comprise quasi square waves.

20. The non-transitory computer readable medium of claim 17, wherein the method further comprises applying a triangle waveform to the generated signals prior to the summing.

* * * * *